US011321736B2

(12) United States Patent
Lagi et al.

(10) Patent No.: US 11,321,736 B2
(45) Date of Patent: May 3, 2022

(54) METHODS AND SYSTEMS FOR AUTOMATED GENERATION OF PERSONALIZED MESSAGES

(71) Applicant: HubSpot, Inc., Cambridge, MA (US)

(72) Inventors: Marco Lagi, Medford, MA (US); Vedant Misra, Cambridge, MA (US); Kevin Walsh, Somerville, MA (US); Scott Judson, Boston, MA (US)

(73) Assignee: HubSpot, Inc., Cambridge, MA (US)

( * ) Notice: Subject to any disclaimer, the term of this patent is extended or adjusted under 35 U.S.C. 154(b) by 0 days.

(21) Appl. No.: 16/668,696

(22) Filed: Oct. 30, 2019

(65) Prior Publication Data

US 2020/0065857 A1 Feb. 27, 2020

Related U.S. Application Data

(63) Continuation of application No. PCT/US2018/032348, filed on May 11, 2018.
(Continued)

(51) Int. Cl.
*G06Q 30/02* (2012.01)
*G06N 20/00* (2019.01)
(Continued)

(52) U.S. Cl.
CPC ..... *G06Q 30/0254* (2013.01); *G06F 16/9535* (2019.01); *G06F 16/9538* (2019.01);
(Continued)

(58) Field of Classification Search
CPC ........... G06F 16/24578; G06F 16/9535; G06F 16/35; H04L 51/32; H04N 21/25883; G06Q 50/12
See application file for complete search history.

(56) References Cited

U.S. PATENT DOCUMENTS 7,136,941 B2 11/2006 Nguyen et al.
7,580,982 B2 8/2009 Owen et al.
(Continued)

FOREIGN PATENT DOCUMENTS

WO 2016156858 A1 10/2016
WO 2018089619 A1 5/2018
(Continued)

OTHER PUBLICATIONS

U.S. Appl. No. 16/408,020, filed May 9, 2019, Pending, Jared Williams et al.
(Continued)

*Primary Examiner* — Saba Dagnew
(74) *Attorney, Agent, or Firm* — GTC Law Group PC & Affiliates

(57) ABSTRACT

A system includes a set of crawlers that find and retrieve documents from an information network, an information extraction system, a knowledge graph storing nodes and edges that connect them, wherein each node represents a respective entity of a corresponding entity type of a plurality of entity types, and wherein the knowledge graph further stores event data relating to events detected by the information extraction system, a machine learning system that trains models that are used in connection with at least one of entity extraction, event extraction, recipient identification, and content generation, a lead scoring system that scores the relevance of information to an individual and references information in the knowledge graph, and a content generation system that generates content of a personalized message to a recipient who is an individual for which the lead scoring system has determined a threshold level of relevance.

23 Claims, 15 Drawing Sheets

Related U.S. Application Data

(60) Provisional application No. 62/504,549, filed on May 11, 2017.

(51) Int. Cl.
| | |
|---|---|
| *G06F 16/95* | (2019.01) |
| *G06N 7/00* | (2006.01) |
| *G06F 16/9535* | (2019.01) |
| *G06F 16/9538* | (2019.01) |

(52) U.S. Cl.
CPC .............. *G06N 7/005* (2013.01); *G06N 20/00* (2019.01); *G06Q 30/0269* (2013.01)

(56) References Cited

U.S. PATENT DOCUMENTS

| | | | |
|---|---|---|---|
| 7,584,114 B2 | 9/2009 | Estrada et al. | |
| 7,792,835 B2 | 9/2010 | Bohannon et al. | |
| 7,831,676 B1 | 11/2010 | Nagar | |
| 7,984,297 B2 | 7/2011 | Bohannon et al. | |
| 7,992,145 B2 | 8/2011 | Emerson et al. | |
| 8,006,261 B1* | 8/2011 | Haberman | H04N 21/25883 |
| | | | 725/34 |
| 8,224,902 B1 | 7/2012 | Glasser et al. | |
| 8,442,969 B2 | 5/2013 | Gross | |
| 8,594,618 B2 | 11/2013 | Meyer et al. | |
| 8,706,800 B1 | 4/2014 | Ahmed et al. | |
| 8,719,356 B2 | 5/2014 | Dillingham et al. | |
| 9,304,862 B2 | 4/2016 | Simon et al. | |
| 9,305,104 B2 | 4/2016 | Wu et al. | |
| 9,317,816 B2 | 4/2016 | Zeng et al. | |
| 9,356,947 B2 | 5/2016 | Shraim et al. | |
| 10,115,060 B2 | 10/2018 | Chestnut et al. | |
| 10,217,058 B2 | 2/2019 | Gamon et al. | |
| 10,387,559 B1 | 8/2019 | Wendt et al. | |
| 10,771,425 B2 | 9/2020 | Kebinger et al. | |
| 10,826,866 B2 | 11/2020 | Kramer et al. | |
| 10,853,082 B1 | 12/2020 | Aleti et al. | |
| 10,867,003 B2 | 12/2020 | O'Donnell et al. | |
| 10,911,394 B2 | 2/2021 | Kramer et al. | |
| 10,931,623 B2 | 2/2021 | O'Brien et al. | |
| 10,992,780 B1 | 4/2021 | Rudrappa Goniwada et al. | |
| 11,070,511 B2 | 7/2021 | O'Brien et al. | |
| 11,165,741 B2 | 11/2021 | O'Brien et al. | |
| 2002/0099697 A1 | 7/2002 | Jensen-Grey | |
| 2002/0152254 A1 | 10/2002 | Teng | |
| 2002/0199194 A1 | 12/2002 | Ali et al. | |
| 2003/0097617 A1 | 5/2003 | Goeller et al. | |
| 2003/0208472 A1 | 11/2003 | Pham | |
| 2004/0034652 A1 | 2/2004 | Hofmann et al. | |
| 2004/0111327 A1 | 6/2004 | Kidd et al. | |
| 2004/0122803 A1* | 6/2004 | Dom | G06F 16/9535 |
| 2004/0260621 A1 | 12/2004 | Foster et al. | |
| 2005/0160166 A1 | 7/2005 | Kraenzel | |
| 2005/0188028 A1 | 8/2005 | Brown et al. | |
| 2005/0210111 A1 | 9/2005 | Fukudome | |
| 2005/0265319 A1 | 12/2005 | Clegg et al. | |
| 2006/0095556 A1 | 5/2006 | Arnold et al. | |
| 2006/0212931 A1 | 9/2006 | Shull et al. | |
| 2006/0224673 A1 | 10/2006 | Stern et al. | |
| 2006/0242140 A1 | 10/2006 | Wnek et al. | |
| 2007/0011073 A1 | 1/2007 | Gardner et al. | |
| 2007/0136430 A1 | 6/2007 | Qureshi et al. | |
| 2007/0203996 A1 | 8/2007 | Davitz et al. | |
| 2007/0299777 A1 | 12/2007 | Shraim et al. | |
| 2008/0027951 A1 | 1/2008 | Bohannon et al. | |
| 2008/0034432 A1 | 2/2008 | Bohannon et al. | |
| 2008/0168269 A1 | 7/2008 | Wilson | |
| 2008/0172606 A1 | 7/2008 | White | |
| 2009/0013041 A1 | 1/2009 | Farmer et al. | |
| 2009/0019003 A1 | 1/2009 | Bohannon et al. | |
| 2009/0119268 A1* | 5/2009 | Bandaru | G06Q 10/0631 |
| | | | 705/7.12 |
| 2009/0138711 A1 | 5/2009 | Heimbigner | |
| 2009/0248813 A1 | 10/2009 | Sawhney | |
| 2010/0161506 A1 | 6/2010 | Bosenick et al. | |
| 2010/0161735 A1 | 6/2010 | Sharma | |
| 2010/0186088 A1 | 7/2010 | Banerjee et al. | |
| 2010/0228777 A1 | 9/2010 | Imig et al. | |
| 2010/0235915 A1 | 9/2010 | Memon et al. | |
| 2010/0312837 A1 | 12/2010 | Bodapati et al. | |
| 2011/0029504 A1* | 2/2011 | King | G06F 16/93 |
| | | | 707/709 |
| 2011/0149725 A1 | 6/2011 | Zhao et al. | |
| 2011/0179067 A1 | 7/2011 | Dalvi et al. | |
| 2011/0258218 A1 | 10/2011 | Hayes et al. | |
| 2012/0053887 A1 | 3/2012 | Nurmi | |
| 2012/0191546 A1 | 7/2012 | Phelan et al. | |
| 2012/0197862 A1* | 8/2012 | Woytowitz | G06F 16/36 |
| | | | 707/710 |
| 2012/0198056 A1 | 8/2012 | Shama et al. | |
| 2012/0202449 A1 | 8/2012 | Meyer et al. | |
| 2012/0316904 A1 | 12/2012 | Eder | |
| 2012/0324580 A1 | 12/2012 | Glasser et al. | |
| 2013/0007627 A1 | 1/2013 | Monaco | |
| 2013/0047034 A1 | 2/2013 | Salomon et al. | |
| 2013/0054622 A1* | 2/2013 | Karmarkar | G06F 16/436 |
| | | | 707/749 |
| 2013/0073336 A1 | 3/2013 | Heath | |
| 2013/0138555 A1 | 5/2013 | Shishkov | |
| 2013/0238715 A1 | 9/2013 | Sanyal et al. | |
| 2013/0339456 A1 | 12/2013 | Nikolayev et al. | |
| 2014/0006139 A1 | 1/2014 | Aggarwal et al. | |
| 2014/0025683 A1 | 1/2014 | Howland et al. | |
| 2014/0025763 A1 | 1/2014 | Furlong et al. | |
| 2014/0108309 A1 | 4/2014 | Frank et al. | |
| 2014/0156681 A1 | 6/2014 | Lee et al. | |
| 2014/0214974 A1 | 7/2014 | Kurzanski et al. | |
| 2014/0236663 A1 | 8/2014 | Smith et al. | |
| 2014/0258169 A1 | 9/2014 | Wong et al. | |
| 2014/0279622 A1 | 9/2014 | Lamoureux et al. | |
| 2014/0280453 A1* | 9/2014 | Mattison | H04L 51/32 |
| | | | 709/202 |
| 2014/0280614 A1* | 9/2014 | Alakuijala | H04L 51/32 |
| | | | 709/206 |
| 2014/0328172 A1 | 11/2014 | Kumar et al. | |
| 2014/0372363 A1 | 12/2014 | Chestnut et al. | |
| 2014/0372566 A1 | 12/2014 | Milne et al. | |
| 2015/0006647 A1 | 1/2015 | Steinberg et al. | |
| 2015/0019910 A1 | 1/2015 | Simon et al. | |
| 2015/0032826 A1 | 1/2015 | Gunaratnam | |
| 2015/0032827 A1 | 1/2015 | Tyler et al. | |
| 2015/0081611 A1 | 3/2015 | Shivakumar | |
| 2015/0100896 A1 | 4/2015 | Shmarovoz et al. | |
| 2015/0154664 A1 | 6/2015 | Dawson et al. | |
| 2015/0188874 A1 | 7/2015 | Feinstein | |
| 2015/0237061 A1 | 8/2015 | Shraim et al. | |
| 2015/0248490 A1 | 9/2015 | Myslinski | |
| 2015/0286357 A1 | 10/2015 | Penha et al. | |
| 2015/0312187 A1 | 10/2015 | Menna et al. | |
| 2015/0324469 A1 | 11/2015 | Keyngnaert et al. | |
| 2015/0347924 A1 | 12/2015 | Zeng et al. | |
| 2015/0379018 A1 | 12/2015 | Gur et al. | |
| 2015/0381552 A1 | 12/2015 | Vijay et al. | |
| 2016/0012364 A1 | 1/2016 | Filgueiras | |
| 2016/0020917 A1 | 1/2016 | Tuatini et al. | |
| 2016/0026720 A1 | 1/2016 | Lehrer et al. | |
| 2016/0036750 A1 | 2/2016 | Yuan et al. | |
| 2016/0063560 A1 | 3/2016 | Hameed et al. | |
| 2016/0078455 A1 | 3/2016 | O'Donnell et al. | |
| 2016/0119260 A1 | 4/2016 | Ghafourifar et al. | |
| 2016/0180248 A1 | 6/2016 | Regan | |
| 2016/0226808 A1 | 8/2016 | Lin | |
| 2016/0232540 A1 | 8/2016 | Gao et al. | |
| 2016/0307191 A1 | 10/2016 | Turgeman et al. | |
| 2016/0315969 A1 | 10/2016 | Goldstein | |
| 2016/0359793 A1 | 12/2016 | Kraios | |
| 2017/0005954 A1 | 1/2017 | Shaltiel et al. | |
| 2017/0031894 A1 | 2/2017 | Bettersworth et al. | |
| 2017/0068982 A1* | 3/2017 | Vangala | G06Q 50/12 |
| 2017/0103439 A1 | 4/2017 | Kolb et al. | |
| 2017/0103441 A1 | 4/2017 | Kolb et al. | |
| 2017/0186042 A1 | 6/2017 | Wong et al. | |

(56) References Cited

U.S. PATENT DOCUMENTS

| | | | |
|---|---|---|---|
| 2017/0221089 A1 | 8/2017 | Zhu et al. | |
| 2017/0264577 A1 | 9/2017 | Ganin et al. | |
| 2017/0289287 A1* | 10/2017 | Modi | G06F 16/24578 |
| 2017/0317962 A1 | 11/2017 | Chen | |
| 2017/0337569 A1 | 11/2017 | Sasson | |
| 2017/0353410 A1 | 12/2017 | Gonzales | |
| 2018/0039696 A1* | 2/2018 | Zhai | G06F 16/35 |
| 2018/0097759 A1 | 4/2018 | Brechbuhl et al. | |
| 2018/0097828 A1 | 4/2018 | Coskun | |
| 2018/0121986 A1 | 5/2018 | Akkiraju et al. | |
| 2018/0137203 A1 | 5/2018 | Hennekey et al. | |
| 2018/0219818 A1 | 8/2018 | Kramer et al. | |
| 2018/0219819 A1 | 8/2018 | O'Brien et al. | |
| 2018/0219820 A1 | 8/2018 | Kramer et al. | |
| 2018/0219829 A1 | 8/2018 | Kebinger et al. | |
| 2018/0219830 A1 | 8/2018 | O'Brien et al. | |
| 2018/0336495 A1 | 11/2018 | Chestnut et al. | |
| 2019/0347668 A1 | 11/2019 | Williams et al. | |
| 2020/0036673 A1 | 1/2020 | O'Brien et al. | |
| 2020/0067861 A1 | 2/2020 | Leddy et al. | |
| 2020/0210867 A1 | 7/2020 | Banis et al. | |
| 2020/0244615 A1 | 7/2020 | O'Brien et al. | |

FOREIGN PATENT DOCUMENTS

| | | |
|---|---|---|
| WO | 2018140975 A1 | 8/2018 |
| WO | 2018209254 A1 | 11/2018 |

OTHER PUBLICATIONS

U.S. Appl. No. 16/595,602, filed Oct. 8, 2019, Pending, Michael O'Brien et al.

PCT/US18/32348, "International Application Serial No. PCT/US18/32348, International Search Report and Written Opinion dated Jul. 30, 2018", HubSpot, Inc., 10 Pages.

PCT/US2017/060835, "International Application Serial No. PCT/US2017/060835, International Preliminary Report on Patentability dated May 23, 2019", HubSpot, Inc., 7 pages.

PCT/US2017/060835, "International Application Serial No. PCT/US2017/060835, International Search Report and Written Opinion dated Feb. 14, 2018", HubSpot Inc., 12 pages.

PCT/US2018/016038, "International Application Serial No. PCT/US2018/016038, International Preliminary Report on Patentability dated Aug. 8, 2019", HubSpot, Inc., 8 pages.

PCT/US2018/016038, "International Application Serial No. PCT/US2018/016038, International Search Report and the Written Opinion dated May 29, 2018.", Hubspot Inc., 12 pages.

PCT/US2018/016038, "International Application Serial No. PCT/US2018/016038, Invitation to Pay Additional Fees and, Where Applicable, Protest Fee mailed on Apr. 2, 2018", Hubspot Inc., 3 pages.

PCT/US18/32348, "International Application Serial No. PCT/US18/32348, International Preliminary Report on Patentability dated Nov. 21, 2019", HubSpot, Inc., 9 pages.

U.S. Appl. No. 17/121,300, filed Dec. 14, 2020, Pending, O'Donnell, Christopher, et al.

U.S. Appl. No. 17/443,211, filed Jul. 22, 2021, Pending, Hennekey, Tim, et al.

U.S. Appl. No. 17/443,213, filed Jul. 22, 2021, Pending, O'Brien, Michael, et al.

U.S. Appl. No. 17/318,731, filed May 12, 2021, Pending, Urdiales, Hector, et al.

U.S. Appl. No. 17/318,737, filed May 12, 2021, Pending, Urdiales, Hector, et al.

U.S. Appl. No. 17/448,228, filed Sep. 21, 2021, Pending, Layton, Stuart P., et al.

Givens, Brien, "Bounded Knapsack Algorithm", www.codeproject.com,https://www.codeproject.com/Articles/706838/Bounded-Knapsack-Algorithm, Jan. 8, 2014, 5 pages.

Godiksen, Brian, "Best Practices with Sender Policy Framework (SPF)", www.socketlabs.com,https://www.socketlabs.com/blog/best-practices-sender-policy-framework-spf/, Sep. 14, 2017, 16 pages.

Gorrell, Amy, "How to Build Your SPF Record in 5 Simple Steps", validity.com, https://www.validity.com/blog/how-to-build-your-spf-record-in-5-simple-steps/, Feb. 9, 2019, 3 pages.

Qureshi, et al., "Improving the Performance of Crawler Using Body Text Normalization", 2 Compusoft 7, 2013, pp. 215, 216.

\* cited by examiner

METHODS AND SYSTEMS FOR AUTOMATED GENERATION OF PERSONALIZED MESSAGES

CLAIM OF PRIORITY

This application is a continuation of International Application Serial Number PCT/US18/32348, filed May 11, 2018, and entitled "METHODS AND SYSTEMS FOR AUTOMATED GENERATION OF PERSONALIZED MESSAGES". International Application Serial Number PCT/US18/32348 claims priority to U.S. Provisional Patent Application Ser. No. 62/504,549, filed May 11, 2017, and entitled "SYSTEM AND METHOD FOR AUTOMATIC DATA COLLECTION, RECIPIENT DISCOVERY, AND MESSAGING". Each of the foregoing applications is incorporated by reference in its entirety for all purposes.

TECHNICAL FIELD

The present application relates to the fields of automated identification of recipients of messages and generation of personalized messages for the recipients.

BACKGROUND

Fundamentally, sales people and marketers face at least two questions when trying to generate business: (1) whom should they reach out to? and (2) what should they say? For very small businesses, owners and employees may know their customers personally, and offerings, and conversations about them, may be straightforward. However, as businesses grow, and offerings become more numerous and complex, it becomes increasingly difficult to separate prospective customers who may have interest in an offering from others, and it becomes increasingly difficult to provide communications that are personalized and relevant to the prospective customers. To address the need to reach many customers, solutions exist for preparing and sending large batches of emails to lists of recipients. Namely, emails may follow simple templates that may include placeholders to insert contact information (such as a first name) of a recipient. A user may provide a structured list of recipients and a template, which are used to generate a mass email. However, recipients have become increasingly sophisticated in recognizing these mass emails, and spam prevention systems have become increasingly effective at blocking mass emails before they even reach the intended recipients. A need exists for methods and systems that allow businesses and other entities to reach large numbers of people with communications that are more likely to be of interest, in particular to recipients who are likely to have high interest in the offerings of the businesses and other entities.

SUMMARY

The present disclosure is directed to various ways of improving the functioning of computer systems, information networks, data stores, search engine systems and methods, and other advantages.

Methods and systems disclosed herein include ones for automated prospecting, such as for finding appropriate individuals to whom one or more messages may be sent, for finding relevant content that may be of interest to those individuals, and for automatically generating communication content to send to those individuals.

In embodiments, methods and systems are described for pulling information from public sources, such as on the Internet, at large scale, determining which individuals should receive a communication (such as based on a scoring algorithm), taking text from available information sources, and generating language that can go into emails or other communications. In embodiments, this may include automatically generating emails and identifying recipients for emails to start a conversation, such as for sales, marketing, service and other activities of an enterprise that involve communicating with current and prospective customers. In embodiments, the methods and systems disclosed herein may be used in any context where text needs to be personalized and/or where someone needs to be found.

In broad terms, the present disclosure relates to a system for automatic communication using personalized messages that are composed using information collected from publicly and privately available sources. Thus, provided herein are methods, components, services, modules, circuits, systems, articles, and other elements of a platform and system (these being collectively referred to, except where context indicates otherwise, as the "system 200") for automatic discovery of recipients who may be interested in an offering, and for automatic synthesis of messages and communications to those recipients. As used herein, "messages" should be understood to encompass, except where context indicates otherwise, a wide range of text, audio, video, voice and other communications that may be prepared in digital form, including email messages, chats, dialog conducted by a conversational agent or dialog manager, text messages, messages contained in active windows of websites or other content, messages delivered in advertisements (such as banner advertisements), and the like. In many preferred embodiments, messages are email messages or chat messages that are prepared (by or with assistance from the system) for a marketer, sales person, service provider, manufacturer, or the like that has an offering (such as of goods or services) and that are targeted to recipients who may be interested in the offering.

The system may include a range of machine learning features and systems that facilitate automated generation of directed content for communications with large numbers of recipients, while nevertheless providing personalized or customized communication content for the recipients. In embodiments, the system learns about potential recipients by extracting publicly and privately available information. In embodiments, the system learns how to select the recipients that are most likely to be interested in the offering. In embodiments, the system predicts the conditions that indicate a recipient might be interested in the offering. In embodiments, the system learns how to compose the message to each recipient in a way that increases the likelihood they will engage in a conversation about the offering.

As used herein the term "set" should be understood to include one or more members.

According to some embodiments of the present disclosure a system is disclosed. The system includes a set of crawlers that find and retrieve documents from an information network and an information extraction system that extracts information from the documents retrieved by the set of crawlers. The system further includes a knowledge graph that stores a plurality of nodes and a plurality of edges that connect respective nodes, wherein each node represents a respective entity of a corresponding entity type of a plurality of entity types and the plurality of entity types include at least one of business entities and individuals. The knowledge graph further stores event data relating to a plurality of events detected by the information extraction system. The system further includes a machine learning system that trains one or more models that are used in connection with at least one of entity extraction, event extraction, recipient identification, and content generation. The system also includes a lead scoring system that scores the relevance of an item of retrieved information to an individual, the lead scoring system referencing information in the knowledge graph. The system further includes a content generation system that generates content of a personalized message to a recipient, wherein the recipient is an individual for which the lead scoring system has determined a threshold level of relevance and wherein the content generation system uses the understanding from the set of machine learning systems to generate the content.

According to some embodiments, the information extraction system includes an entity extraction system that extracts entity data from the documents and an event extraction system that extracts the event data from the documents.

According to some embodiments, the information extraction system updates the knowledge graph with information extracted from the documents. In some embodiments, a node of the knowledge graph represents at least one of a business entity and an individual and defines an entity value that indicates the business entity or the individual. In some embodiments, an edge of the knowledge graph connecting a first node and a second node in the knowledge graph represents a relationship between a first entity represented by the first node and a second entity represented by the second node, wherein the edge defines a relationship type. In some embodiments, the event data extracted by the event extraction system is associated with at least one of a node and an edge of the knowledge graph.

According to some embodiments, information extracted by the information extraction system is stored with an indicator of a level of confidence in the accuracy of the information.

According to some embodiments, the system is configured to only use information that exceeds a threshold level of confidence.

According to some embodiments, the information extraction system is configured to parse unstructured data using a frame of tags that characterize a particular type of event.

According to some embodiments, the particular type of event is a management change and the frame includes at least one of the name of an individual, an organization, a role in an organization, and an action related to the role.

According to some embodiments, the information extraction system is configured to parse job postings to extract an indicator of a need of an organization.

According to some embodiments, the information extraction system is configured to parse a news article to determine a news event related to at least one of an organization and an individual.

According to some embodiments, the information extraction system utilizes a classification model trained on a training data set.

According to some embodiments, training the classification model is supervised.

According to some embodiments, the machine learning system trains at least one model of the one or more models on respective outcomes of a plurality of the communications to recipients. In some of these embodiments, at least one of the one or more models trained by the machine learning system is a feed forward neural network trained on the respective outcomes.

According to some embodiments, the information network includes the Internet.

According to some embodiments, information network includes a private network and the documents are retrieved from a customer relationship management system.

According to some embodiments, at least one of the set of crawlers is configured to pull a subset of the documents from a public source based on a pre-existing understanding of a structure of the subset of the documents in the public source.

According to some embodiments, at least one of the set of crawlers is configured to pull a subset of the documents from an unstructured public source without requiring a pre-existing understanding of a structure of the subset of the documents in the public source.

According to some embodiments, the generated content is a subject line for an email to the recipient.

According to some embodiments, generated content is a greeting for an email to the recipient.

According to some embodiments, the generated content is an opening line for an email to the recipient.

According to some embodiments, the generated content references news about a business entity of the recipient.

According to some embodiments, the generated content references an affinity of the recipient that is understood from the retrieved information.

According to some embodiments, the generated content references an industry event attended by the recipient.

According to some embodiments, the system provides a user with information about at least one of a possible recipient, contacts of the possible recipient and a business entity of the possible recipient. In some embodiments, the knowledge graph is dynamically updated to reflect events found by the set of crawlers. In some embodiments, the system determines a likelihood of a recipient being interested in an offering of the user. In some embodiments, the system provides an indicator of the likelihood to the user.

According to some embodiments, the lead scoring system filters a list of possible recipients to include only those recipients that exceed a threshold level of confidence regarding the likelihood of interest in an offering of the user.

According to some embodiments, the lead scoring system filters a list of possible recipients to include only those recipients that exceed a threshold level of confidence regarding the likelihood of being willing to engage in a conversation about an offering of the user. In some embodiments, the system uses outcome data from targeting of messages generated by the system to improve filtering of recipients. In some embodiments, the outcomes include whether a transaction was completed with a recipient. Outcome data about completion of a transaction may be automatically extracted from a customer-relationship management database of the user.

According to some embodiments, the content generation system generates a targeted message to each recipient that exceeds a threshold likelihood of interest in engaging in a conversation about an offering of the user. In some embodiments, the personalized message includes content regarding information about the recipient from the knowledge graph. In some embodiments, the personalized message includes content regarding an event relevant to the recipient. In some embodiments, the personalized message includes content regarding a business entity associated with the recipient.

According to some embodiments, the machine learning system iteratively tests variations of at least one of the timing, the language, and the topic of personalized message. In some embodiments, the machine learning system uses outcomes of the iteratively personalized messages to improve generation of new targeted messages. In some embodiments, the outcomes include whether a transaction was completed with a recipient. In some embodiments, outcome data about completion of a transaction is automatically extracted from a customer-relationship management database of the user.

According to some embodiments of the present disclosure, a method is disclosed. The method includes obtaining, by a processing system, a recipient profile indicating one or more attributes of an ideal recipient of a message to be sent on behalf of a user. The method further includes obtaining, by the processing system, message data indicating one or more of an objective of the message and a message template that includes content to be included in the message. The method further includes determining, by the processing system, a recipient list based on the recipient profile and a knowledge graph. The knowledge graph stores: i) entity data relating to a plurality of entities, each entity being of a particular entity type of a plurality of different entity types and having one or more entity attributes that are stored in the knowledge graph, wherein the plurality of entity types include business entities and individual entities, ii) relationship data relating to a plurality of relationships, each relationship being of a particular relationship type of a plurality of relationship types, wherein at least a subset of the relationships represent relationships between two entities, and iii) event data relating to a plurality of detected events relating to entities and relationships represented in the knowledge graph. The recipient list identifies one or more individuals that are more likely to result in a successful outcome given the recipient profile and information represented in the knowledge graph. Furthermore, for each individual in the recipient list, the method includes generating, by the processing system, a personalized message that is personalized to the individual based on one or more of the entity data, the relationship data, and the event data; and providing, by the processing system, the personalized message via a communication network.

According to some embodiments, providing the personalized message includes transmitting the personalized message to an account associated with the individual.

According to some embodiments, providing the personalized message includes transmitting the personalized message to a client device of the user.

According to some embodiments, the knowledge graph stores a plurality of nodes and a plurality of edges that connect respective nodes from the plurality of nodes, wherein each node represents a respective entity of a respective entity type and each edge corresponds to a respective relationship of a respective relationship type.

According to some embodiments, the method further includes: receiving, by the processing device, one or more digital documents crawled by one or more crawlers; extracting, by the processing device, a new entity from the one or more digital documents; extracting, by the processing device, a new relationship relating to the new entity and a previous entity based on the one or more digital documents and the knowledge graph, the previous entity being represented in the knowledge graph by a previous node; and updating, by the processing device, the knowledge graph with a new node representing the newly discovered entity and a new edge corresponding to the new relationship. The new edge connects the new node to the previous node. In some embodiments, the method further includes: extracting, by the processing device, a new event corresponding to the new entity, wherein extracting the new relationship is further based on the new event. In some embodiments, the new event is extracted using an event classification model that is trained to identify events indicated in documents. In some embodiments, the new relationship is extracted using an inference engine. In some embodiments, the new entity is extracted using an entity classification model that is trained to identify entities indicated in documents.

According to some embodiments, obtaining the recipient profile includes receiving the recipient profile from a client device associated with the user.

According to some embodiments, obtaining the recipient profile includes determining the one or more attributes of the ideal recipient based on the objective of the message and on historical data relating to outcomes associated with previously sent messages generated to achieve the objective of the message.

According to some embodiments, determining the recipient list includes filtering entities from the plurality of entities represented in the knowledge graph based on the one or more attributes.

According to some embodiments, determining the recipient list includes, for each individual of a subset of individual represented in the knowledge graph, determining a lead score of the individual based on the one or more attributes of the recipient profile using a machine-learned scoring model. In some embodiments, the lead score of each individual is further based on an event related to the individual and/or an organization of the individual. In some embodiments, the lead score of each individual is further based on entity data relating to the individual and/or an organization of the individual. In some embodiments, the lead score of each individual is further based on relationship data relating to the individual and/or an organization of the individual.

According to some embodiments, generating a personalized message for an individual includes: retrieving the entity data from the knowledge graph, wherein the entity data relates to the individual or an organization of the individual; generating directed content based on the retrieved entity data, wherein the directed content includes at least a phrase or sentence that includes information corresponding to the retrieved entity data; and generating the personalized message based on the directed content and the message template. In some embodiments, the directed content is generated based on a machine-learned generative model that is trained to generate text given entity data of an entity and a particular objective of a message. In some embodiments, the machine-learned generative model is trained to generate text that is most likely to result in a message with a successful outcome.

According to some embodiments, generating a personalized message for an individual includes: retrieving the event data from the knowledge graph, wherein the event data relates to an event that occurred with respect to the individual or an organization of the individual; generating directed content based on the retrieved event data, wherein the directed content includes at least a phrase or sentence that includes information corresponding to the retrieved event data; and generating the personalized message based on the directed content and the message template. In some embodiments, the directed content is generated based on a machine-learned generative model that is trained to generate text given a particular objective of a message and event data relating to a known event that occurred with respect to an entity and a particular objective of a message.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Embodiments of the present disclosure are directed to computers, computer systems, networks and data storage arrangements comprising digitally encoded information and machine-readable instructions. The systems are configured and arranged so as to accomplish the present methods, including by transforming given inputs according to said instructions to yield new and useful outputs determining behaviors and physical outcomes. Users of the present system and method will gain new and commercially significant abilities to convey ideas and to promote, create, sell and control articles of manufacture, goods, and other products. The machinery in which the present system and method are implemented will therefore comprise novel and useful devices and architectures of computing and processing equipment for achieving the present objectives.

Figure 1:
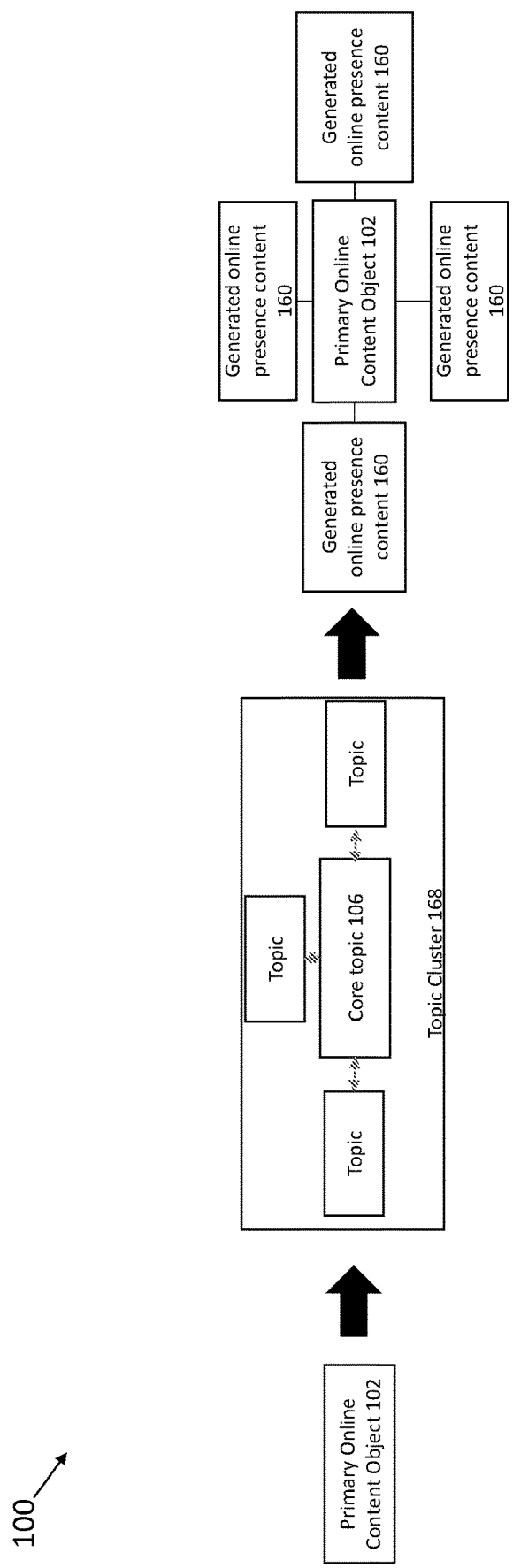
FIG. 1 depicts a high-level flow in which a content platform is used to process online content, identify a cluster of semantically relevant topics and produce generated online presence content involving the semantically relevant topics.

With reference to FIG. 1, in embodiments of the present disclosure, a platform is provided having a variety of methods, systems, components, services, interfaces, processes, components, data structures and other elements (collectively referred to as the "content development platform 100" except where context indicates otherwise), which enable automated development, deployment and management of content, typically for an enterprise, that is adapted to support a variety of enterprise functions, including marketing strategy and communications, website development, search engine optimization, sales force management, electronic commerce, social networking, and others. Among other benefits, the content development platform 100 uses a range of automated processes to extract and analyze existing online content of an enterprise, parse and analyze the content, and develop a cluster of additional content that is highly relevant to the enterprise, without reliance on conventional keyword-based techniques. Referring to FIG. 1, the content development platform 100 may generally facilitate processing of a primary online content object 102, such as a main web page of an enterprise, to establish a topic cluster 168 of topics that are relevant to one or more core topics 106 that are found in or closely related to the content of the primary line content object 102, such as based on semantic similarity of the topics in the topic cluster 168, including core topics 106, to content within the primary content object 102. The platform 100 may further enable generation of generated online presence content 160, such as reflecting various topics in the topic cluster 168, for use by marketers, sales people, and other writers or content creators on behalf of the enterprise.

In embodiments, the content development platform 100 includes methods and systems for generating a cluster of correlated content from the primary online content object 102. In embodiments, the primary online content object 102 is a web page of an enterprise. In embodiments, the primary online content object 102 is a social media page of an enterprise. In the embodiments described throughout this disclosure, the main web page of an enterprise, or of a business unit of an enterprise, is provided as an example of a primary online content object 102 and in some cases herein is described as a "pillar" of content, reflecting that the web page is an important driver of business for the enterprise, such as for delivering marketing messages, managing public relations, attracting talent, and routing or orienting customers to relevant products and other information. References to a web page or the like herein should be understood to apply to other types of primary online content objects 102, except where context indicates otherwise. An objective of the content development platform 100 may be to drive traffic to a targeted web page, in particular by increasing the likelihood that the web page may be found in search engines, or by users following links to the web page that may be contained in other content, such as content developed using the content development platform 100.

In an aspect, the present systems, data configuration architectures and methods allow an improvement over conventional online content generation schemes. As stated before, traditional online promotional content relied on key word placement and on sympathetic authorship of a main subject (e.g., a web site) and corresponding secondary publications (e.g., blogs and sub-topical content related to the web site), which methods rely on known objective and absolute ranking criteria to successfully promote and rank the web site and sub-topical content. In an increasingly subjective, personalized and context-sensitive search environment, the present systems and methods develop canonical value around a primary online content object such as a web site. In an aspect, a cluster of supportive and correlated content is intelligently generated or indicated so as to optimize and promote the online work product of a promoter (e.g., in support of an agenda or marketing effort). In an example, large numbers of online pages are taken as inputs to the present system and method (e.g., using a crawling, parallel or sequential page processing machine and software).

As shown in simplified FIG. 1, a "core topic" 106 or main subject for a promotional or marketing effort, related to one or more topics, phrases, or the like extracted based on the methods and systems described herein from a primary online content object 102, may be linked to a plurality of supporting and related other topics, such as sub-topics. The core topic 106 may comprise, for example, a canonical source of information on that general subject matter, and preferably be a subject supporting or justifying links with other information on the general topic of a primary online content object 102. In embodiments, visitors to a site where generated online content 160 is located can start at a hyperlinked sub-topic of content and be directed to a core topic 106 within a page, such as a page linked to a primary online content object 102 or to the primary online content object 102 itself. In an example, a core topic 106 can be linked to several (e.g., three to eight, or more) sub-topics. A recommendation or suggestion tool, to be described further below, can recommend or suggest sub-topics, or conversely, it can dissuade or suggest avoidance of sub-topics based on automated logic, which can be enabled by a machine learned process. As will be discussed herein, a content strategy may be employed in developing the overall family of linked content, and the content strategy may supersede conventional key word based strategies according to some or all embodiments hereof.

In embodiments, the system and method analyze, store and process information available from a crawling step, including for a given promoter's web site (e.g., one having a plurality of online pages) so as to determine a salient subject matter and potential sub-topics related to said subject matter of the site. Associations derived from this processing and analysis are stored and further used in subsequent machine learning based analyses of other sites. Data derived from the analysis and storage of the above pages, content and extracted analytics may be organized in an electronic data store, which is preferably a large aggregated database and which may be organized for example using MYSQL or a similar format.

Figure 2:
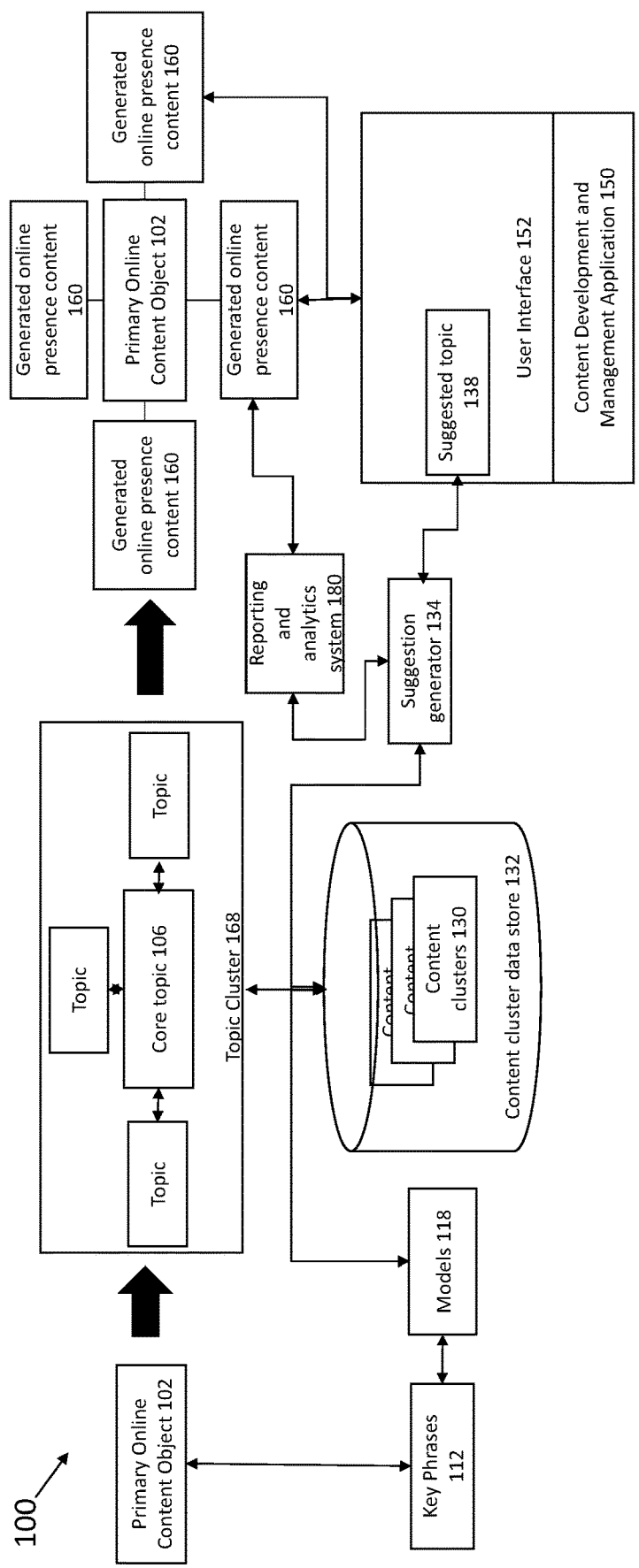
FIG. 2 provides a functional block diagram of certain components and elements of a content development platform, including elements for extracting key phrases from a primary online content object, a content cluster data store for storing clusters of topics and a content development and management application having a user interface for developing content.

FIG. 2 provides a detailed functional block diagram of certain components and elements of a content development platform, including elements for extracting key phrases from a primary online content object, a content cluster data store for storing clusters of topics and a content development and management application 150 having a user interface for developing content. Within the platform 100, key phrases 112 are extracted from the primary online content object 102 and are processed, such as using a variety of models 118, resulting in one or more content clusters 130 that are stored in a content cluster data store 132. The clusters may comprise the topic clusters 168 that are semantically relevant to core topics reflected in the primary content object 102, as indicated by the key phrases. The models 118, which may access a corpus of content extracted by crawling a relevant set of pages on the Internet, are applied to the key phrases 112 to establish the clusters, which arrange topics around a core topic based on semantic similarity. From the content clusters 130 a suggestion generator 134 may generate one or more suggested topics 138, which may be presented in a user interface 152 of a content development management application 150 within which an agent of an enterprise, such as a marketer, a sales person, or the like may view the suggested topic 138 and relevant information about it (such as indicators of its similarity or relevancy as described elsewhere herein) and create content, such as web pages, emails, customer chats, and other online presence content 160 on behalf of the enterprise. Within the interface 152, the resulting generated online presence content 160 may be linked to the primary online content object 102, such that the primary online content object 102 and one or more generated online presence objects 160 form a cluster of semantically related content, such that visitors to any one of the objects 102, 160 may be driven, including by the links, to the other objects 102, 160. In particular, the platform 100 enables driving viewers who are interested in the topics that differentiate the enterprise to the online presence content, such as the main web pages, of the enterprise. Performance of the topics may be tracked, such as in a reporting and analytics system 180, such that performance-based suggestions may be provided by the suggestion generator 134, such as by suggesting more suggested topics 138 that are similar to ones that have driven increases in traffic to the primary online content object 102.

The system and method are then capable of projection of the crawled, stored and processed information, using the present processing hardware, networking and computing infrastructure so as to generate specially-formatted vectors, e.g., a single vector. The vector or vectors can be according to a Word2vec model used to produce word embeddings in a multi-layer neural network or similar arrangement. Those skilled in the art may appreciate that further reconstruction of linguistic contexts of words are possible by taking a body of content (e.g., language words) to generate such vector(s) in a suitable vector space. Said vectors may further indicate useful associations of words and topical information based on their proximity to one another in said vector space. Vectors based on other content information (e.g., phrases or documents, which can be referred to as Phrase2vec or Document2vec herein) may also be employed in some embodiments. Documents or pages having similar semantic meaning would be conceptually proximal to one another according to the present model. In this way, new terms or phrases or documents may be compared against known data in the data store of the system and generate a similarity, relevance or nearness quantitative metric. Cosine similarity or other methods can be employed as part of this nearness determination. The similarity may be translated into a corresponding score in some embodiments. In other aspects, said score may be used as an input to another process or another optional part of the present system. In yet other aspects, the output may be presented in a user interface presented to a human or machine. The score can further be presented as a "relevance" metric. Human-readable suggestions may be automatically generated by the system and method and provided as outputs, output data or output signals in a processor-driven environment such as a modern computing architecture. The suggestions may in some aspects provide a content context model for guiding promoters (e.g., marketers) towards a best choice of topical content to prepare and put up on their web sites, including suitable and relevant recommendations for work product such as articles and blog posts and social media materials that would promote the promoters' main topics or subjects of interest or sell the products and services of the marketers using the system and method.

In an aspect, the present system and method allows for effective recommendations to promoters that improve the link structure between existing content materials such as online pages, articles and posts. In another aspect, this allows for better targeting of efforts of a promoter based on the desired audience of the efforts, including large groups, small groups or even individuals.

Implementations of the present system and method can vary as would be appreciated by those skilled in the art. For example, the system and method can be used to create a content strategy tool using processing hardware and special machine-readable instructions executing thereon. Consider as a simple illustrative example that a promoter desires to best market a fitness product, service or informational topic. This can be considered as a primary or "core topic" about which other secondary topics can be generated, which are in turn coupled to or related to the core topic. For example, weight lifting, dieting, exercise or other secondary topics may be determined to have a favorable context-based relevance to the core topic. Specific secondary sub-topics about weight lifting routines, entitled, e.g., 'Best weight lifting routines for men' or 'How to improve your training form' (and so on) may be each turned into a blog post that links back to the core topic web page.

When a user uses the content strategy tool of the present system and method the user may be in some embodiments prompted to select or enter a core (primary) topic based on the user's own knowledge or the user's field of business. The tool may them use this, along with a large amount of crawled online content that was analyzed, or along with extracted information resulting from such crawling of online content and prior stored search criteria and results, which is now context-based, to validate a topic against various criteria.

In an example, topics are suggested (or entered topics are rated) based on the topics' competitiveness, popularity and relevance. Those skilled in the art may appreciate other similar criteria which can be used as metrics in the suggestion or evaluation of a topic.

Competitiveness can comprise a measure of how likely a domain (Web domain) would be ranked on "Page 1" for a particular term or phrase. The lower the percentile ranking, the more difficult it is to rank for that term or phrase (e.g., as determined by a Moz rank indicating a site's authority).

Popularity as a metric is a general measure of a term or phrase's periodic (e.g., monthly) search volume from various major search engines. The greater this percentage, the more popular the term or phrase is.

Relevance as a metric generally indicates how close a term or phrase is to other content put up on the user's site or domain. The lower the relevance, the further away the term or phrase is from what the core topic of the site or domain is. This can be automatically determined by a crawler that crawls the site or domain to determine its main or core topic of interest to consumers. If relevance is offered as a service by the present system and method a score can be presented through a user or machine interface indicating how relevant the new input text is to an existing content pool.

Timeliness of the content is another aspect that could be used to drive content suggestions or ratings with respect to a core topic. For example, a recent-ness (recency) metric may be used in addition to those given above for the sake of illustration of embodiments of the system and method.

Therefore, analysis and presentation of information indicating cross relationships between topics becomes effective under the present scheme. These principles may further be applied to email marketing or promotional campaigns to aid in decision making as to the content of emails sent to respective recipients so as to maximally engage the recipients in the given promotion.

Other possible features include question classification; document retrieval; passage retrieval; answer processing; and factoid question answering.

Note that the present concepts can be carried across languages insofar as an aspect hereof provides for manual or automated translation from a first language to a second language, and that inputs, results and outputs of the system can be processed in one or another language, or in a plurality of languages as desired.

Figure 3:
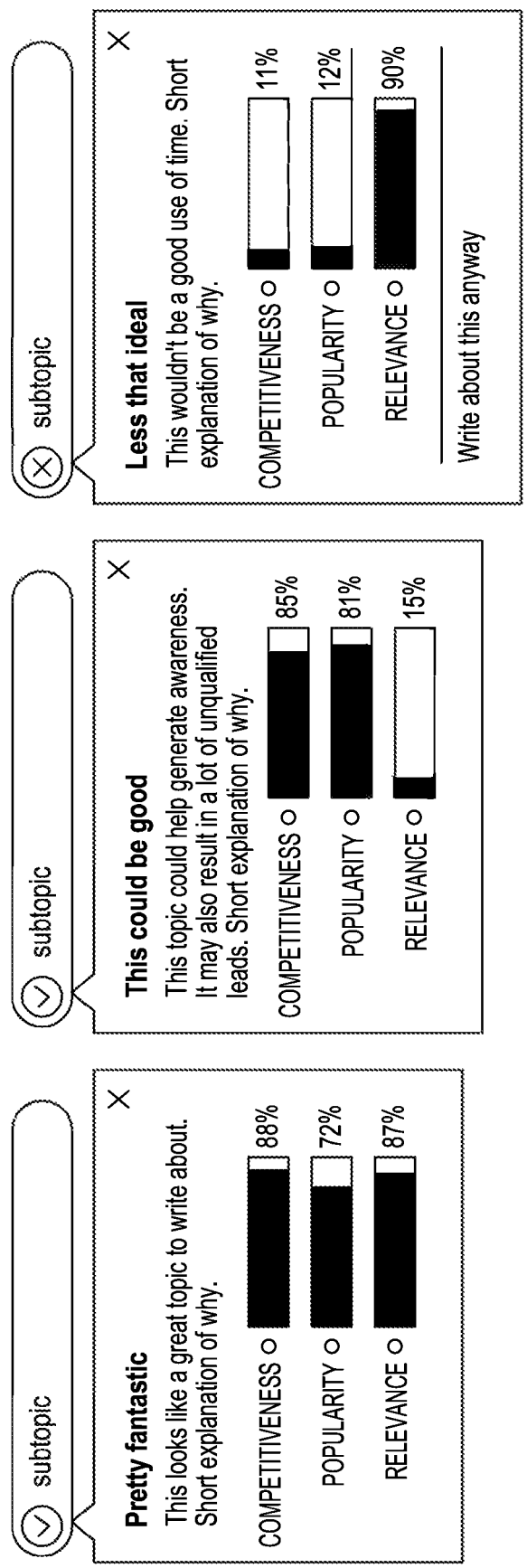
FIGS. 3, 4, and 5 show examples of user interface elements for presenting suggested topics and related information.
Figure 4:
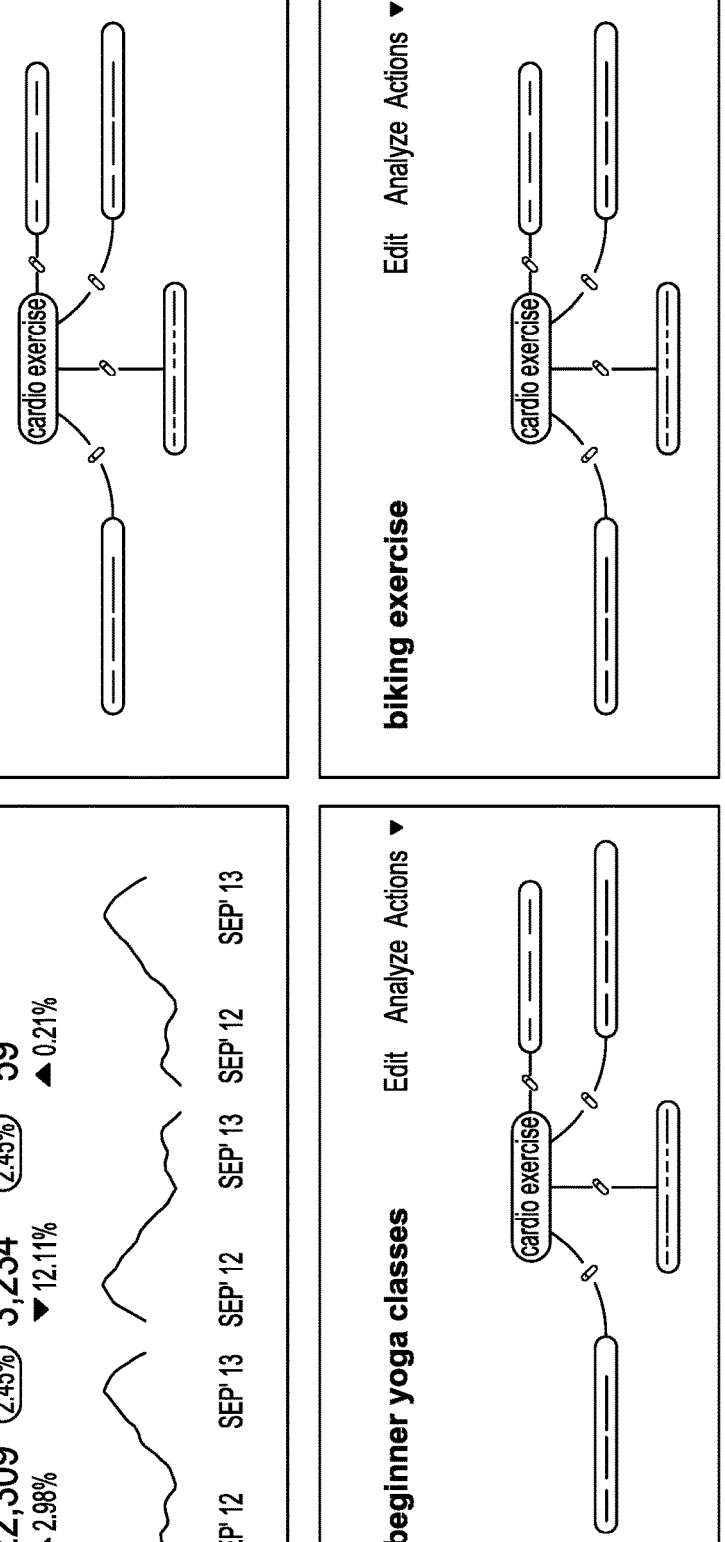
Figure 5:
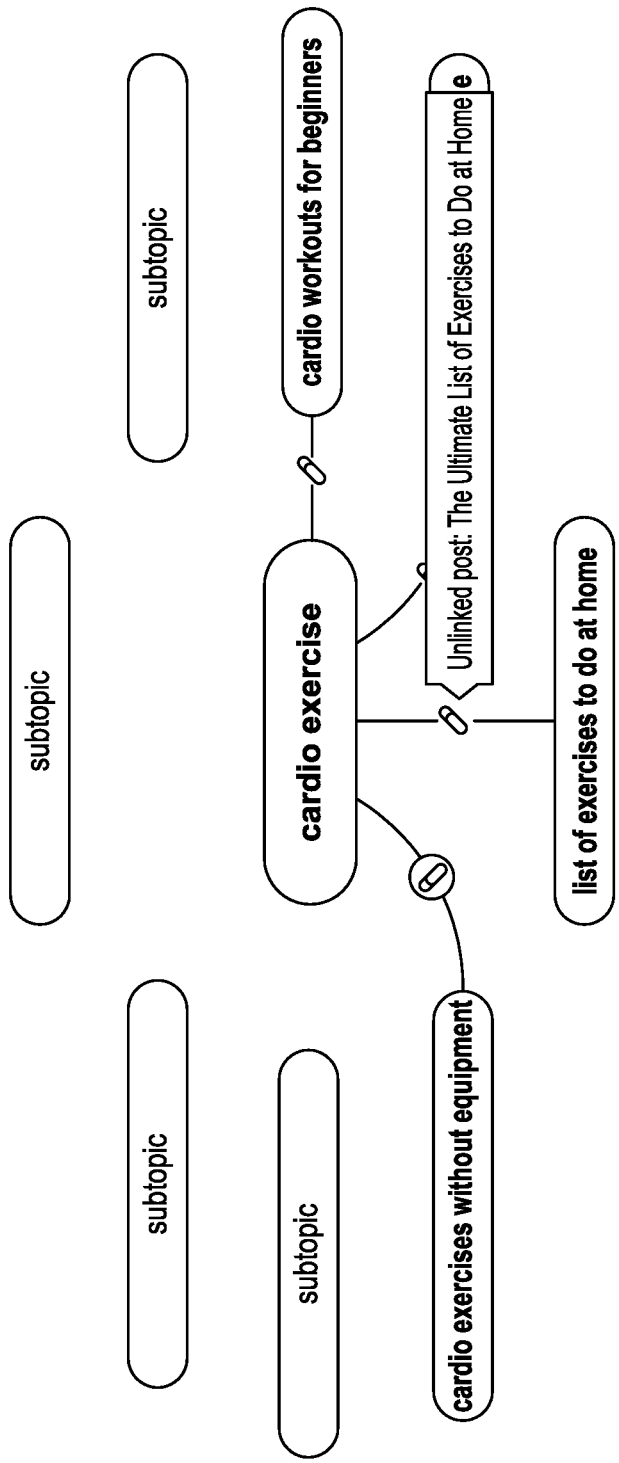

FIG. 3, FIG. 4, and FIG. 5 are illustrative depictions of exemplary simplified aspects of the present system, method and tools. These depictions are not meant to be exhaustive or limiting, but are merely examples of how some features could be provided to a user of the system and method.

Some embodiments hereof employ a latent semantic analysis (LSA) model, encoded using data in a data store and programmed instructions and/or processing circuitry to generate an output comprising an association between various content by the promoter user of the system and method. LSA being applied here to analyze relationships between a (large) set of documents and the data contained therein. In one embodiment machine learning may be used to develop said association output or outputs.

Figure 6:
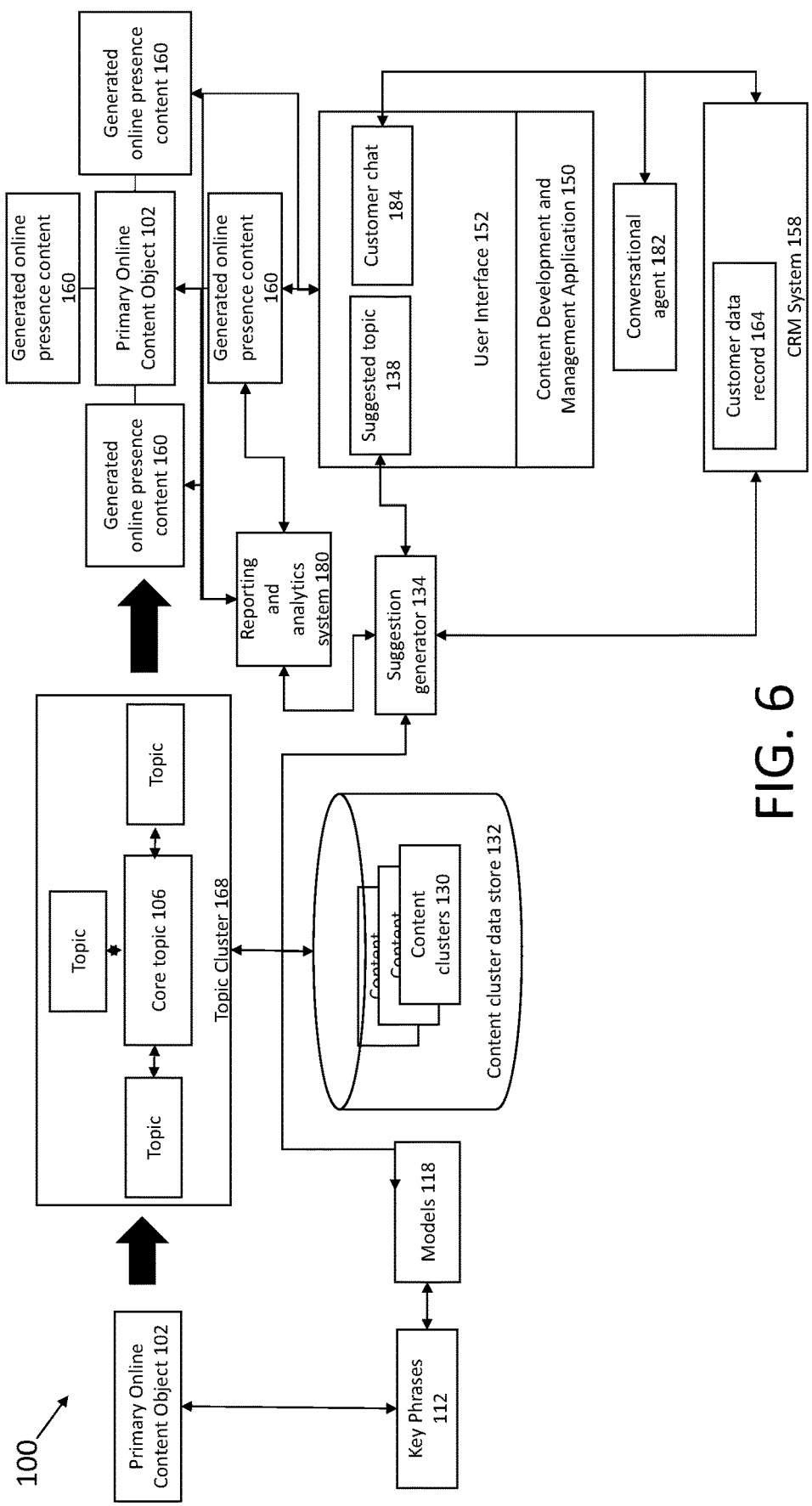
FIG. 6 provides a functional block diagram of certain components and elements of a content development platform, including integration of a customer relationship management system with other elements of the platform.

FIG. 6 provides a functional block diagram of certain additional optional components and elements of the content development platform 100, including integration of a customer relationship management system 158 with other elements of the platform. In embodiments, the generated online content object 160 may comprise messaging content for a customer interaction that is managed via a customer relationship management system 158. In embodiments, the customer relationship management system 158 may include one or more customer data records 164, such as reflecting data on groups of customers or individual customers, including demographic data, geographic data, psychographic data, data relating to one or more transactions, data indicating topics of interest to the customers, data relating to conversations between agents of the enterprise and the customers, data indicating past purchases, interest in particular products, brands, or categories, and other customer relationship data. The customer data records 164 may be used by the platform 100 to provide additional suggested topics 138, to select among suggested topics 138, to modify suggested topics 138, or the like. In embodiments, the CRM system 158 may support interactions with a customer, such as through a customer chat 184, which in embodiments may be edited in the user interface 152 of the content development and management application 150, such as to allow a writer, such as an inside sales person or marketer who is engaging in the customer chat 184 with the customer to see suggested topics 138 that may be of interest to the customer, such as based on the customer data records 164 and based on relevancy of the topics to the main differentiators of the enterprise. In embodiments, a conversational agent 182 may be provided within or integrated with the platform 100, such as for automating one or more conversations between the enterprise and a customer. The conversational agent 182 may take suggested topics from the suggestion generator 134 to facilitate initiation of conversations with customers around topics that differentiate the enterprise, such as topics that are semantically relevant to key phrases found in the primary online content object 102. In embodiments, the conversational agent 182 may populate a customer chat 184 in the user interface 152, such as providing seed or draft content that a writer for the enterprise can edit.

Figure 7:
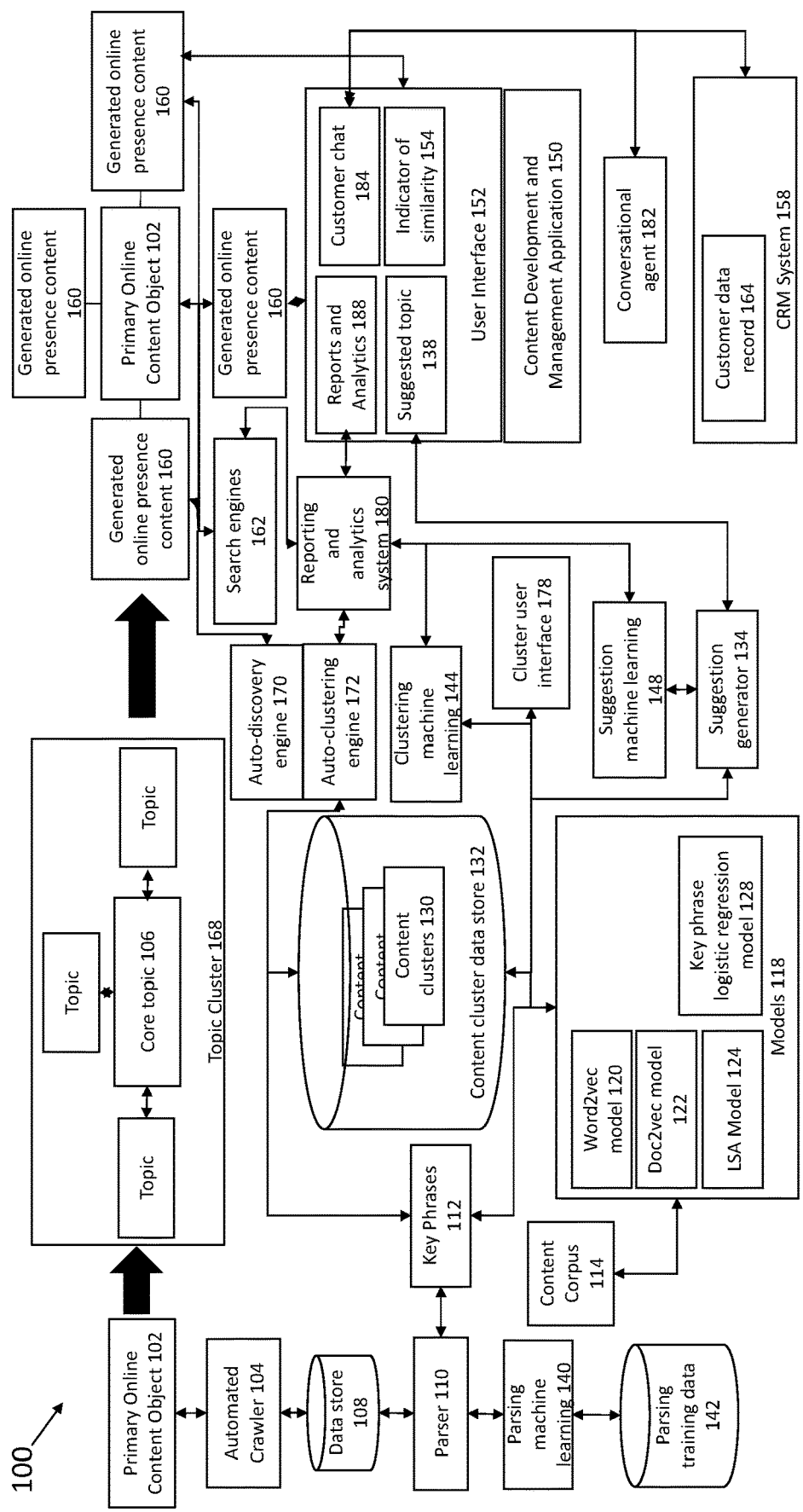
FIG. 7 provides a detailed functional block diagram of components and elements of a content development platform.

FIG. 7 provides a detailed functional block diagram of components and elements of a content development platform. The methods and systems may include an automated crawler 104 for crawling the primary online content object 102 and storing a set of results from the crawling in a data storage facility 108. In embodiments, the data storage facility is a cloud-based storage facility, such as a simple storage facility, such as an S3™ bucket provided by Amazon™, such as on a web service platform, such as the Amazon Web Services™ (AWS) platform. In embodiments, the data storage facility is a distributed data storage facility. In embodiments, the automated crawler 104 crawls one or more domains associated with an enterprise customers' content, such as the customer's portal, main web page, or the like, as the primary online content object 102, in order to identify topics already in use on those sites and stores the pages in S3™ storage, with metadata in a database, such as a MySQL database. The content development platform 100 may include a parser 110 for parsing the stored content from the crawling activity of the automated crawler 104 to generate a plurality of key phrases 112 and to generate a content corpus 114 from the primary online content object 102. The content development platform 100 may include, use or integrate with one or more of a plurality of models 118 for processing at least one of the key phrases 112 and the corpus 114.

The models 118 may include one or more of a word2vec model 120, a doc2vec model 122, a latent semantic analysis (LSA) extraction model, or LSA model 124, and a key phrase logistic regression model 128, wherein the processing results in a plurality of content clusters 130 representing topics within the primary online content object 102. In embodiments, the platform 100 may take content for a primary content object 102, such as a website, and extract a number of phrases, such as a number of co-located phrases, based on processing the n-grams present in the content (e.g., unigrams, bi-grams, tri-grams, tetra-grams, and so on), which may in the LSA model 124, be ranked based on the extent of presence in the content and based on a vocabulary that is more broadly used across a more general body of content, such as a broad set of Internet content. This provides a vector representation of a website within the LSA model 124. Based on crawling with automatic crawler 104 of over 619 million pages on the public internet (seeking to ignore those pages that are light on content), an LSA model 124 has been trained using machine learning, using a training set of more than 250 million pages, such that the LSA model 124 is trained to understand associations between elements of content.

In embodiments, the one or more models 118 include the word2vec model 120 or other model (e.g., doc2vec 122 or phrase2vec) that projects crawled-domain primary online object content 102, such as from customers' domains, into a single vector. In embodiments, the vector space is such that documents that contain similar semantic meaning are close together. The application of the word2vec model 120 and the doc2vec model 122 to the vector representation of primary content object 102 (e.g., website) to draw vectors may result in a content-context model based on co-located phrases. This allows new terms to be compared against that content context database to determine how near it is to the enterprise's existing primary online content objects 102 (e.g., webpages), such as using cosine similarity. That similarity may then be converted into a score and displayed through the UI, such as displaying it as a "Relevancy" score. Ultimately, the content context model may be used to give recommendations and guidance for how individuals can choose good topics to write about, improve the link structure of existing content, and target marketing and other efforts based on their audiences' individual topic groups of interest. In embodiments, the plurality of models 118 used by the platform may comprise other forms of model for clustering documents and other content based on similarity, such as a latent semantic indexing model, a principle component analysis model, or the like. In embodiments other similar models may be used, such as a phrase2vec model, or the like.

An objective of the various models 118 is to enable clustering of content, or "topic clusters 168" around relevant key phrases, where the topic clusters 168 include semantically similar words and phrases (rather than simply linking content elements that share exactly matching keywords). Semantic similarity can be determined by calculating vector similarity around key phrases appearing in two elements of content. In embodiments, topic clusters may be automatically clustered, such as by an auto-clustering engine 172 that manages a set of software jobs that take web pages from the primary content object 102, use a model 118, such as the LSA model 124 to turn the primary content object 102 into a vector representation, project the vector representation on to a space (e.g., a two-dimensional space), perform an affinity propagation that seeks to find natural groupings among the vectors (representing clusters of ideas within the content), and show the groupings as clusters of content. Once groups are created, a reviewer, such as a marketer or other content developer, can select one or more "centers" within the clusters, such as recognizing a core topic within the marketer's "pillar" content (such as a main web page), which may correspond to the primary content object 102. Nodes in the cluster that are in close proximity to the identified centers may represent good additional topics about which to develop content or to which to establish links; for example, topic clusters can suggest an appropriate link structure among content objects managed by an enterprise and with external content objects, such as third-party objects, where the link structure is based on building an understanding of a semantic organization of cluster of topics and mirroring the other content and architecture of links surrounding a primary content object 102 based on the semantic organization.

The content development platform 100 may include a content cluster data store 132 for storing the content clusters 130. The content cluster data store 132 may comprise a MySQL database or other type of database. The content cluster data store 132 may store mathematical relationships, based on the various models 118, between content objects, such as the primary content object 102 and various other content objects or topics, which, among other things, may be used to determine what pages should be in the same cluster of pages (and accordingly should be linked to each other). In embodiments, clusters are based on matching semantics between phrases, not just matching exact phrases. Thus, new topics can be discovered by observing topics or subtopics within semantically similar content objects in a cluster that are not already covered in a primary content object 102. In embodiments, an auto-discovery engine 170 may process a set of topics in a cluster to automatically discover additional topics that may be of relevance to parties interested in the content of the primary content object 102.

In embodiments, topics within a cluster in the content cluster data store 132 may be associated with a relevancy score 174 (built from the models 118), which in embodiments may be normalized to a single number that represents the calculated extent of semantic similarity of a different topic to the core topic (e.g., the center of a cluster, such as reflecting the core topic of a primary content object 102, such as a main web page of an enterprise). The relevancy score 174 may be used to facilitate recommendations or suggestions about additional topics within a cluster that may be relevant for content development.

The content development platform may include a suggestion generator 134 for generating, using output from at least one of the models, a suggested topic 138 that is similar to at least one topic among the content clusters and for storing the suggested topic 138 and information regarding the similarity of the suggested topic 138 to at least one content cluster 130 in the content cluster data store 132. Suggested topics 138 may include sub-topic suggestions, suggestions for additional core topics and the like, each based on semantic similarity (such as using a relevancy score 174 or similar calculation) to content in the primary content object 102, such as content identified as being at the center of a cluster of topics. Suggestions may be generated by using the keyphrase logistic regression model 128 on the primary content object 102, which, among other things, determines, for a given phrase that is similar to the content in a cluster, how relatively unique the phrase is relative to a wider body of content, such as all of the websites that have been crawled across the broader Internet. Thus, through a combination of identifying semantically similar topics in a cluster (e.g., using the word2vec model 120, doc2vec model 122, and LSA model 124) and identifying which of those are relatively differentiated (using the keyphrase logistic regression model 128), a set of highly relevant, well differentiated topics may be generated, which the suggestion generator 134 may process for production of one or more suggested topics 138.

In embodiments, the parser 110 uses a parsing machine learning system 140 to parse the crawled content. In embodiments, the machine learning system 140 iteratively applies a set of weights to input data, wherein the weights are adjusted based on a parameter of success, wherein the parameter of success is based on the success of suggested topics 138 in the online presence of an enterprise. In embodiments, the machine learning system is provided with a parser training data set 142 that is created based on human analysis of the crawled content.

In embodiments, at least one of the plurality of models used in the platform uses a clustering machine learning system 144 to cluster content into the content clusters 130. In embodiments, the clustering machine learning system 144 iteratively applies a set of weights to input data, wherein the weights are adjusted based on a parameter of success, wherein the parameter of success is based on the success of suggested topics in the online presence of an enterprise. In embodiments, the machine learning system is provided with a training data set that is created based on human clustering of a set of content topics.

In embodiments, the suggestion generator 134 uses a suggestion machine learning system 148 to suggest topics.

In embodiments, the suggestion machine learning system 148 iteratively applies a set of weights to input data, wherein the weights are adjusted based on a parameter of success, wherein the parameter of success is based on the success of suggested topics in the online presence of an enterprise. In embodiments, the suggestion machine learning system 148 is provided with a training data set that is created based on human creation of a set of suggested topics.

In embodiments, the methods and systems disclosed herein may further include a content development and management application 150 for developing a strategy for development of online presence content, the application 150 accessing the content cluster data store 132 and having a set of tools for exploring and selecting suggested topics 138 for online presence content generation. In embodiments, the application 150 provides a list of suggested topics 138 that are of highest semantic relevance for an enterprise based on the parsing of the primary online content object. In embodiments, the methods and systems may further include a user interface 152 of the application 150 for presenting a suggestion, wherein the generated suggestion is presented with an indicator of the similarity 154 of the suggested topic 138 to a topic in the content cluster 130 as calculated by at least one of the models 118.

In embodiments, the content development and management application 150 may include a cluster user interface 178 portion of the user interface 152 in which, after a primary content object 102 has been brought on board to the content development platform 100, a cluster of linked topics can be observed, including core topics in the primary content object 102 and various related topics. The cluster user interface 178 may allow a user, such as a sales or marketing professional, to explore a set of topics, such as seeing topics that are highly relevant to a brand of the enterprise and related topics, which, in embodiments, may be presented with a relevancy score 174 or other measure of similarity, as well as with other information, such as search volume information and the like. In embodiments, the cluster user interface 178 or other portion of the user interface 152 may allow a user to select and attach one or more topics or content objects, such as indicating which topics should be considered at the core for the enterprise, for a brand, or for a particular project. Thus, the cluster framework embodied in the cluster user interface 178 allows a party to frame the context of what topics the enterprise wishes to be known for online (such as for the enterprise as a whole or for a brand of the enterprise).

The content development and management application 150 may comprise a content strategy tool that encourages users to structure content in clusters based on the notion that topics are increasingly more relevant that keywords, so that enterprises should focus on owning a content topic, rather than going after individual keywords. Each topic cluster 168 may have a "core topic," such as implemented as a web page on that core topic. For example, on a personal trainer's website, the core topic might be "weightlifting." Around those core topics 106 should be subtopics (in this example, this might include things like "best weightlifting routines" or "how to improve your weightlifting form"), each of which should be made into a blog post that links back to the core topic page.

When users use the content development and management application 150, or content strategy tool, the user may be prompted to enter a topic based on the user's own knowledge of the enterprise. The content development and management application 150 or tool may also use information gleaned by crawling domains of the enterprise with the automated crawler 104, such as to identify existing topic clusters on their site (i.e., the primary online content object 102). For each identified core topic, the topic may be validated based on one or more metrics or criteria, such as competitiveness, popularity, relevancy, or the like, such as reflected by relevancy based on cosine similarity between a topic and the core topic, or based on various other sources of website analytics data. Competitiveness may comprise a measure of how likely a domain or primary online content object 102 is to rank highly, such as on a first page of search engine results, for a particular word, phrase, or term. The lower the percentage on this metric, the harder it will be to achieve a high rank for that term. This may be determined by a source like MozRank™ (provided by Moz™), a PageRank™ (provided by Google™), or other ranking metric, reflecting the primary online content object's 102 domain authority, absent other factors. Popularity may comprise a general measure of a topic's monthly search volume or similar activity level, such as from various search engines. The higher the percentage, the more popular the term. This may be obtained from a source like SEMRush™, such as with data in broad ranges of 1-1000, 1000-10000, etc. Relevancy may comprise a metric of close a topic, phrase, term or the like to other content, such as topic already covered in other domains of a user, or the like. The lower the relevancy, the further away a given term is from what an enterprise is known for, such as based on comparison to a crawl by the automated crawler 104 of the enterprise's website and other domains. Relevancy may be provided or supported by the content context models 118 as noted throughout this disclosure.

As the models 118 analyze more topics, the models learn and improve, such that increasingly accurate measures may be provided as relevancy and the like. Once the user has selected a topic, the user may be prompted to identify subtopics related to that topic. Also, the platform 100 may recommend or auto-fill subtopics that have been validated based on their similarity to the core topic and based on other scoring metrics. When the user has filled out a cluster of topics, the platform 100 may alert the user to suggested links connecting each subtopic page to a topic page, including recommending adding links where they are currently absent. The content development and management application 150 may also allow customers to track the performance of each cluster, including reporting on various metrics used by customers to analyze individual page performance. The content development and management application 150 or tool may thus provide several major improvements over our current tools, including a better "information architecture" to understand the relationship between pieces of content, built-in keyword validation, and holistic analysis of how each cluster of topics performs.

In embodiments, the user interface 152 facilitates generation of generated online presence content 160 related to the suggested topic 138. In embodiments, the user interface 152 includes at least one of key words and key phrases that represent the suggested topic 138, which may be used to prompt the user with content for the generation of online presence content. In embodiments, the generated online presence content is at least one of website content, mobile application content, a social media post, a customer chat, a frequently asked question item, a product description, a service description and a marketing message. In embodiments, the generated online presence content may be linked to the primary content object 102, such as to facilitate traffic between the generated online presence content and the primary content object 102 and to facilitate discovery of the primary content object 102 and the generated online presence content 160 by search engines 162. The user interface 152 for generating content may include a function for exploring phrases for potential inclusion in generated online presence content 160; for example, a user may input a phrase, and the platform 100 may use a relevancy score 174 or other calculation to indicate a degree of similarity. For example, if a topic is only 58% similar to a core topic, then a user might wish to find something more similar. User interface elements, such as colors, icons, animated elements and the like may help orient a user to favorable topics and help avoid unfavorable topics.

In embodiments, the application 150 may facilitate creation and editing of content, such as blog posts, chats, conversations, messages, website content, and the like, and the platform may parse the phrases written in the content to provide a relevancy score 174 as the content is written. For example, as a blog is being written, the marketer may see whether phrases that are being written are more or less relevant to a primary content object 102 that has been selected and attached to an enterprise, a project, or a brand within the platform 100. Thus, the content development and management application 150 may steer the content creator toward more relevant topics, and phrases that represent those topics. This may include prompts and suggestions from the suggestion generator 134. The user interface 152 may include elements for assisting the user to optimize content, such as optimizing for a given reading level and the like. The user interface 152 may provide feedback, such as confirming that the right key phrases are contained in a post, so that it is ready to be posted.

In embodiments, the application 150 for developing a strategy for development of generated online presence content 160 may access content cluster data store 132 and may include various tools for exploring and selecting suggested topics 138 for generating the generated online presence content 160. In embodiments 150, the application 150 may further access the content of the customer relationship management (CRM) system 158. In embodiments, the application 150 includes a user interface 152 for developing content regarding a suggested topic 138 for presentation in a communication to a customer, wherein selection of a suggested topic 138 for presentation to a customer is based at least in part on a semantic relationship between the suggested topic as determined by at least one of the models 118 and at least one customer data record 164 relating to the customer stored in the customer relationship management system 158.

The platform 100 may include, be integrated with, or feed a reporting and analytics system 180 that may provide, such as in a dashboard or other user interface, such as, in a non-limiting example, in the user interface 152 of the content development and management application 150, various reports and analytics 188, such as various measures of performance of the platform 100 and of the generated online content object 160 produced using the platform 100, such as prompted by suggestions of topics. As search engines have increasingly obscured information about how sites and other content objects are ranked (such as by declining to provide keywords), it has become very important to develop alternative measures of engagement. In embodiments, the platform 100 may track interactions across the life cycle of engagement of an enterprise with a customer, such as during an initial phase of attracting interest, such as through marketing or advertising that may lead to a visit to a website or other primary online content object 102, during a process of lead generation, during conversations or engagement with the customer (such as by chat functions, conversational agents, or the like), during the process of identifying relevant needs and products that may meet those needs, during the delivery or fulfillment of orders and the provision of related services, and during any post-sale follow-up, including to initiate further interactions. By integration with the CRM system 158 of an enterprise, the platform 100 may provide measures that indicate what other activities of or relating to customers, such as generation of leads, visits to web pages, traffic and clickstream data relating to activity on a web page, links to content, e-commerce and other revenue generated from a page, and the like, were related to a topic, such as a topic for which a generated online content object 160 was created based on a suggestion generated in the platform 100. Thus, by integration of a content development and management application 150 and a CRM system 158, revenue can be linked to generated content 160 and presented in the reporting and analytics system 180.

Figure 8:
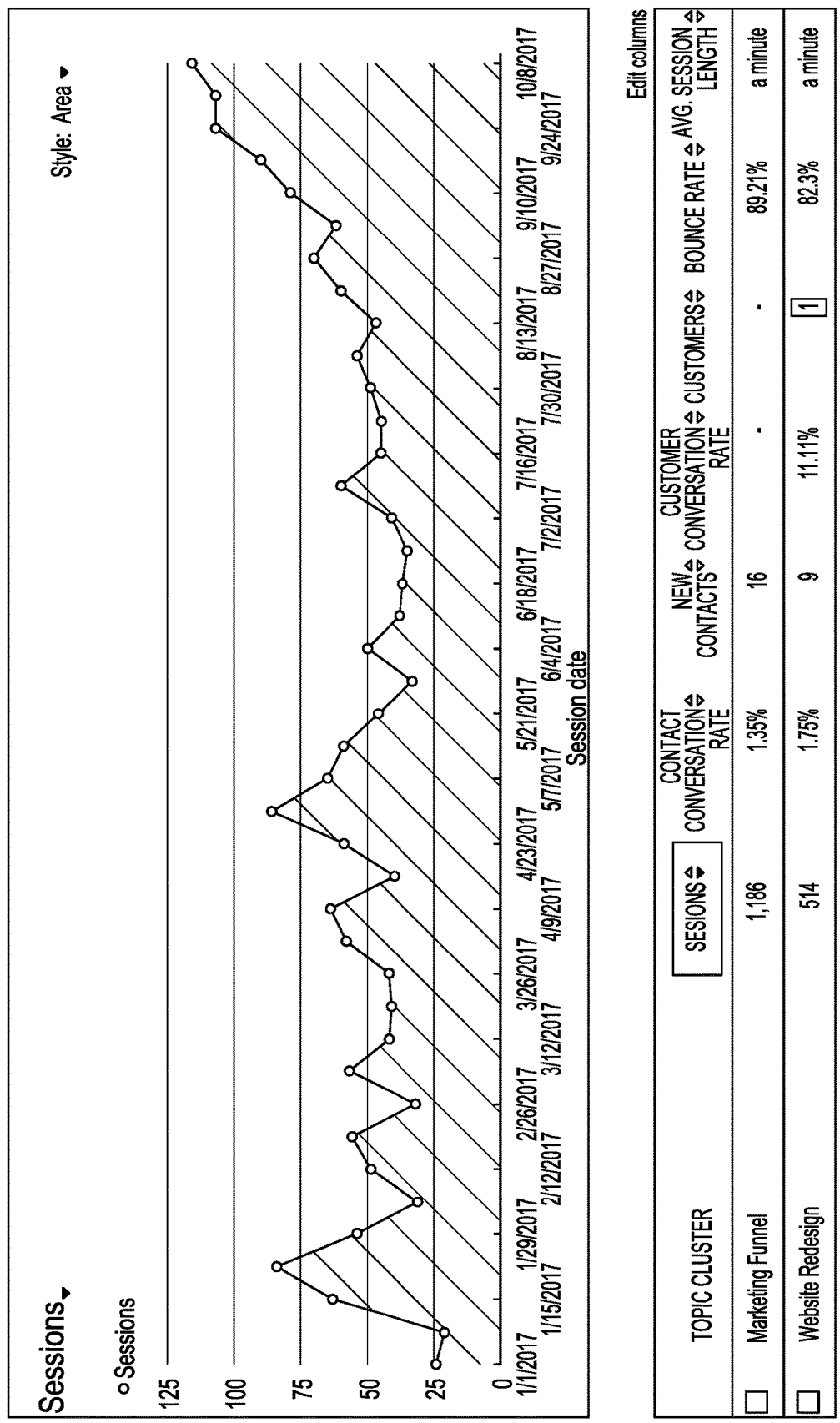
FIG. 8 illustrates a user interface for reporting information relating to online content generated using the content development and management platform.

FIG. 8 shows an example of a user interface of the reporting and analytics system 180.

In general, a wide range of analytics may be aggregated by topic cluster (such as a core topic and related topics linked to the core topic in the cluster), rather than by web page, so that activities involved in generating the content in the cluster can be attributed with the revenue and other benefits that are generated as a result. Among these are elements tracked in a CRM system 158, such as contact events, customers (such as prospective customers, leads, actual customers, and the like), deals, revenue, profit, and tasks.

In embodiments, the platform 100 may proactively recommend core topics, such as based on crawling and scraping existing site content of an enterprise. Thus, also provided herein is the auto-discovery engine 170, including various methods, systems, components, modules, services, processes, applications, interfaces and other elements for automated discovery of topics for interactions with customers of an enterprise, including methods and systems that assist various functions and roles within an enterprise in finding appropriate topics to draw customers into relevant conversations and to extend the conversations in a way that is relevant to the enterprise and to each customer. Automated discovery of relevant content topics may support processes and workflows that require insight into what topics should be written about, such as during conversations with customers. Such processes and workflows may include development of content by human workers, as well as automated generation of content, such as within automated conversational agents, bots, and the like. Automated discovery may include identifying concepts that are related by using a combination of analysis of a relevant item of text (such as core content of a website, or the content of an ongoing conversation) with an analysis of linking (such as linking of related content). In embodiments, this may be performed with awareness at a broad scale of the nature of content on the Internet, such that new, related topics can be automatically discovered that further differentiate an enterprise, while remaining relevant to its primary content. The new topics can be used within a wide range of enterprise functions, such as marketing, sales, services, public relations, investor relations and other functions, including functions that involve the entire lifecycle of the engagement of a customer with an enterprise.

As noted above, customers increasingly expect more personalized interactions with enterprises, such as via context-relevant chats that properly reflect the history of a customer's relationship with the enterprise. Chats, whether undertaken by human workers, or increasingly by intelligent conversational agents, are involved across all of the customer-facing activities of an enterprise, including marketing, sales, public relations, services, and others. Content development and strategy is relevant to all of those activities, and effective conversational content, such as managed in a chat or by a conversational agent 182, needs to relate to relevant topics while also reflecting information about the customer, such as demographic, psychographic and geographic information, as well as information about past interactions with the enterprise. Thus, integration of the content development and management platform 100 with the CRM system 158 may produce appropriate topics within the historical context of the customer and the customer's engagement with the enterprise. For example, in embodiments, tickets or tasks may be opened in a CRM system 158, such as prompting creation of content, such as based on customer-relevant suggestions, via the content development and management application 150, such as content for a conversation or chat with a customer (including one that may be managed by a conversational agent 182 or bot), content for a marketing message or offer to the customer, content to drive customer interest in a web page, or the like. In embodiments, a customer conversation or customer chat 184 may be managed through the content development and management application 150, such as by having the chat occur within the user interface 152, such that an agent of the enterprise, like an inside sales person, can engage in the chat by writing content, while seeing suggested topics 138, indicators of relevance or similarity 154 and the like. In this context, relevance indicators can be based on scores noted above (such as reflecting the extent of relevance to core topics that differentiate the enterprise), as well as topics that are of interest to the customer, such as determined by processing information, such as on historical conversations, transactions, or the like, stored in the CRM system 158. In embodiments, to facilitate increased, the customer chat 184 may be populated with seed or draft content created by an automated conversational agent 182, so that a human agent can edit the content into a final version for the customer interaction.

In embodiments, the models 118 (collectively referred to as one or more content context models), and the platform 100 more generally, may enable a number of capabilities and benefits, including helping users come up with ideas of new topics to write about based on a combination of the content cluster data store 132, a graph of topics for the site or other content of the enterprise, and one or more analytics. This may help writers find gaps in content that should be effective, but that are not currently written about. The models 118, and platform 100 may also enable users to come up with ideas about new articles, white papers and other content based on effective topics. The models 118, and platform 100 may also enable users to understand effectiveness of content at the topic level, so that a user can understand which topics are engaging people and which aren't. This may be analyzed for trends over time, so a user can see if a topic is getting more or less engagement. The models 118, and platform 100 may also enable users to apply information about topics to at the level of the individual contact record, such as in the customer relationship management system 158, to help users understand with what content a specific person engages. For example, for a user "Joe," the platform 100, by combining content development and management with customer relationship management, may understand whether Joe is engaging more in "cardio exercise" or "weight lifting." Rather than only looking at the aggregate level, user may at the individual level for relevant topics. Development of content targeted to an individual's topics of interest may be time-based, such as understanding what content has recently been engaged with and whether preferences are changing over time.

The models 118, and platform 100 may also enable looking at cross relationships between topics. For example, analytics within the platform 100 and on engagement of content generated using the platform 100 may indicate that people who engage frequently with a "cardio" topic also engage frequently with a "running" topic. If so, the platform 100 may offer suggested topics that are interesting to a specific person based on identifying interest in one topic and inferring interest in others.

The models 118, and platform 100 may also enable development of email content, such as based on understanding the topic of the content of an email, an email campaign, or the like. This may include understanding which users are engaging with which content, and using that information to determine which emails, or which elements of content within emails, are most likely to be engaging to specific users.

FIG. 8 illustrates a user interface for reporting information relating to online content generated using the content development and management platform. Various indicators of success, as noted throughout this disclosure, may be presented, such as generated by the reporting and analytics systems 180.

Figure 9:
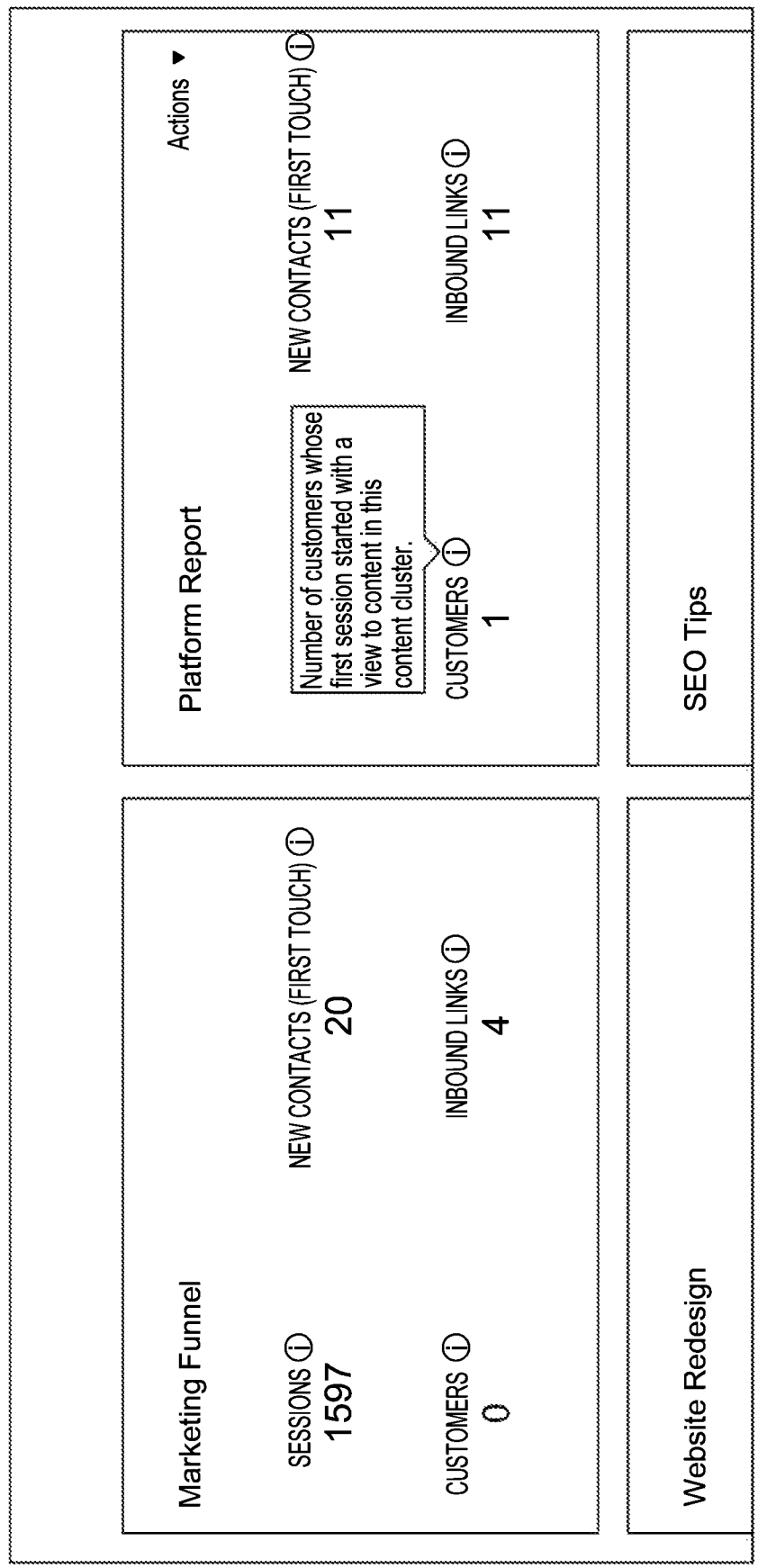
FIG. 9 depicts a user interface in which activity resulting from the use of the platform is reported to a marketer or other user.

FIG. 9 depicts an embodiment of a user interface in which activity resulting from the use of the platform is reported to a marketer or other user. Among other metrics that are described herein, the user interface can report on what customers, such as ones to be entered into or already tracked in the CRM system, have had a first session of engagement with content, such as a web page, as a result of the content strategy, such as where the customers arrive via a link contained in a sub-topic or other topic linked to a core topic as described herein.

The present concepts can be applied to modern sophisticated searching methods and systems with improved success. For example, in a context-sensitive or personalized search request, the results may be influenced by one or more of the following: location, time of day, format of query, device type from which the request is made, and contextual cues.

In an embodiment, a topical cluster comprising a core topic and several sub-topics can be defined and refined using the following generalized process: 1. Mapping out of several (e.g., five to ten) of the topics that a target person (e.g., customer) is interested in; 2. Group the topics into one or more generalized (core) topic into which the sub-topics could be fit; 3. Build out each of the core topics with corresponding sub-topics using keywords or other methods; 4. Map out content ideas that align with each of the core topics and corresponding sub-topics; 5. Validate each idea with industry and competitive research; and 6. Create, measure and refine the data and models and content discovered from the above process. These steps are not intended to be limiting or exhaustive, as those skilled in the art might appreciate alternate or additional steps suiting a given application. Some of the above steps may also be omitted or combined into one step, again, to suit a given application at hand.

In some embodiments, a system and method are provided that can be used to provide relevancy scores (or quantitative metrics) as a service. Content generation suggestions can also be offered as a service using the present system and method, including synonyms, long tail key words and enrichment by visitor analytics in some instances.

Figure 10:
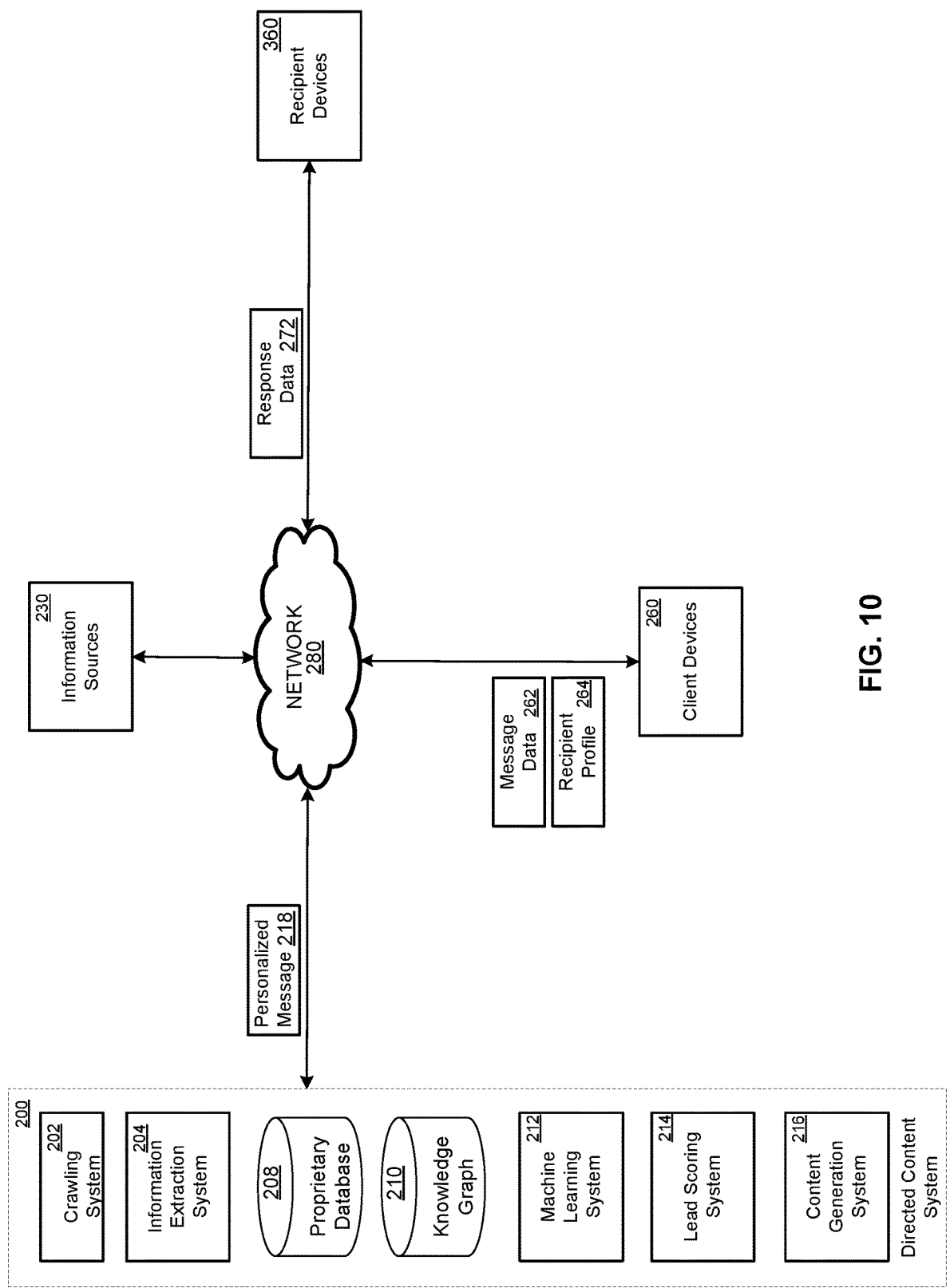
FIG. 10 illustrates an example environment of a directed content system according to some embodiments of the present disclosure.

FIG. 10 illustrates an example environment of a directed content system 200. In embodiments, the directed content system 200 may be configured to generate "directed content." As used herein, directed content may refer to any textual, audio, and/or visual content that is at least partially personalized for an intended recipient based on information derived by the directed content system 200. In embodiments, the directed content system 200 may be configured to identify recipients that are relevant to a client. As used herein, a client may refer to an enterprise (e.g., a company, a non-profit organization, a governmental entity, and the like) or an individual. A user affiliated with a client may access the directed content system 200 using a client device 260. The directed content system 200 may identify one or more intended recipients to which directed content may be sent to and/or may generate directed content to one or more of the intended recipients. The directed content system 200 may then transmit the directed content to the intended recipients.

In embodiments, the directed content system 200 may include, but is not limited to: a crawling system 202 that implements a set of crawlers that find and retrieve information from an information network (e.g., the Internet); an information extraction system 204 that identifies entities, events, and/or relationships between entities or events from the information retrieved by the crawling system 202; one or more proprietary databases 208 that store information relating to organizations or individuals that use the directed content system 200; one or more knowledge graphs 210 representing specific types of entities (e.g., businesses, people, places, products), relationships between entities, the types of those relationships, relevant events, and/or relationships between events and entities; a machine learning system 212 that learns/trains classification models that are used to extract events, entities, and/or relationships, scoring models that are used to identify intended recipients of directed content, and/or models that are used to generate directed models; a lead scoring system 214 that scores one or more organizations and/or individuals with respect to a content generation task, the lead scoring system referencing information in the knowledge graph; and a content generation system 216 that generates content of a communication to a recipient in response to a request from a client to generate directed content pertaining to a particular objective, wherein the recipient is an individual for which the leading scoring system has determined a threshold level of relevance to the objective of a client. The directed content system 200 uses the understanding from the machine learning system 212 to generate the directed content.

In embodiments, the methods and systems disclosed herein include methods and systems for pulling information at scale from one or more information sources. In embodiments, the crawling system 202 may obtain information from external information sources 230 accessible via a communication network 280 (e.g., the Internet), a private network, a proprietary database 208 (such as a content management system, a customer relationship management database, a sales database, a marketing database, a service management database, or the like), or other suitable information sources. Such methods and systems may include one or more crawlers, spiders, clustering systems, proxies, services, brokers, extractors and the like, using various information systems and protocols, such as Representational State Transfer (REST), Simple Object Access Protocol (SOAP), Remote Procedure Call (RPC), Real Time Operating System (RTOS) protocol, and the like. Such methods, systems, components, services and protocols are collectively referred to herein as "crawlers," or a "set of crawlers," except where context indicates otherwise.

In embodiments, the information extraction system 204 may pull relevant information from each of a variety of sources (referred to in some cases herein as streams), parse each stream to figure out the type of stream, and optionally apply one or more explicit parsers to further parse specific streams based on the type or structure of the stream. Some streams with defined, static structures allow for direct extraction of information of known types, which can be inserted into the knowledge graph or other data resource without much further processing. In other cases, such as understanding what event happened given a headline of a news article, more processing is required to develop an understanding of the event that can be stored for further use. Certain events are of particular interest to sales and marketing professionals because they tend to be associated with changes in an organization that may increase or decrease the likelihood that an entity or individual will be interested in a particular offering. These include changes in management, especially in "C-level" executives like the CEO, CTO, CFO, CMO, CIO, CSO or the like and officer-level executives like the President or the VP of engineering, marketing or finance, which may indicate directional changes that tend to lead to increased or decreased purchasing. In embodiments, a machine learning system 212 may be configured to learn to parse unstructured data sources to understand that a specific type of event has occurred, such as an event that is relevant to the likelihood that an organization or individual will be interested in a particular offering. Relevant types of events for which particular machine learning systems 212 may be so configured may include, in addition to changes in management, attendance at trade shows or other industry events, participation in industry organizations like consortia, working groups and standards-making bodies, financial and other events that indicate growth or shrinking of a business, as well as other events described throughout this disclosure.

Figure 11:
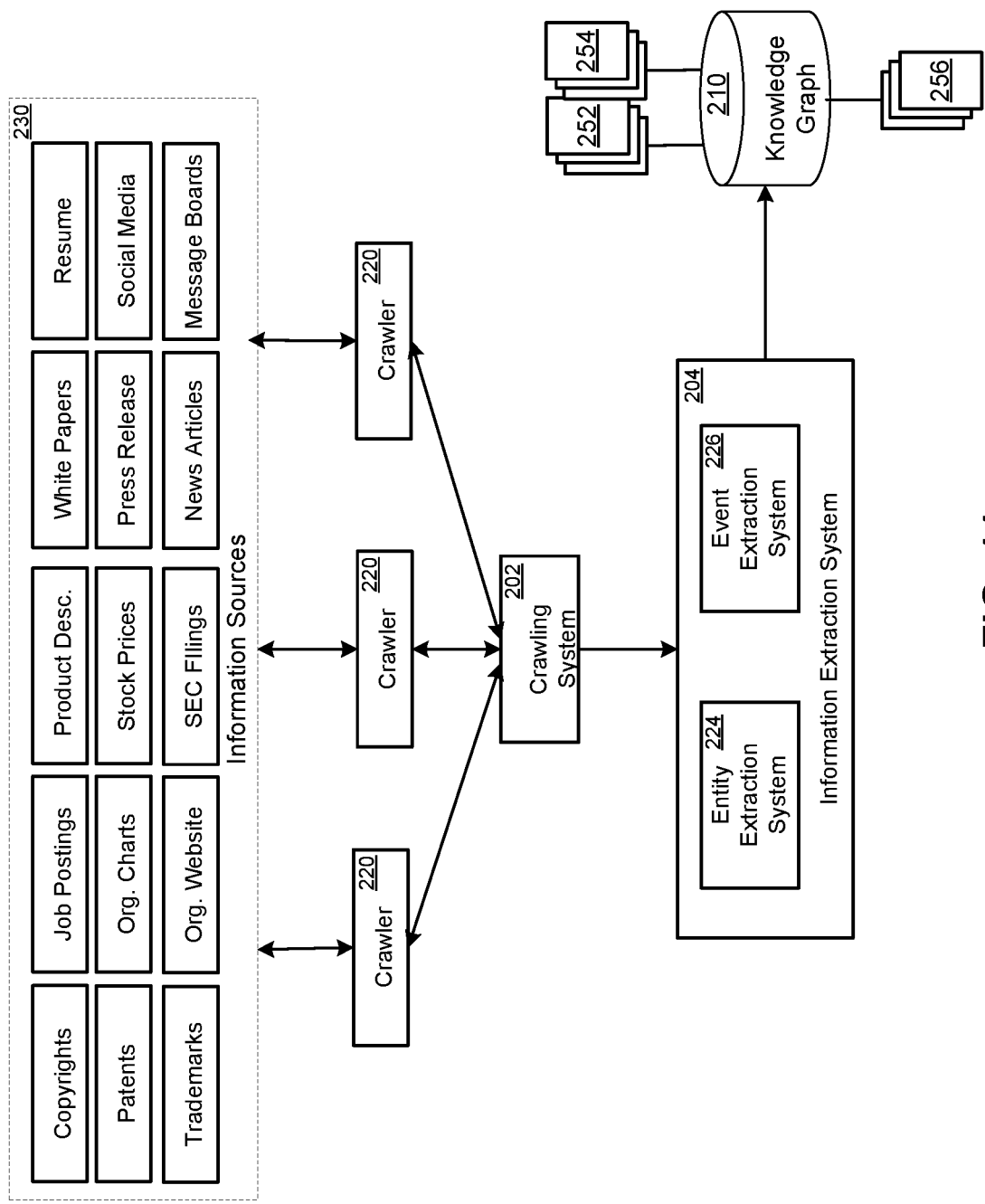
FIG. 11 depicts an example of the crawling system and the information extraction system maintaining a knowledge graph according to some embodiments of the present disclosure.

FIG. 11 illustrates an example of the crawling system 202 and the information extraction system 204 maintaining a knowledge graph 210, whereby the crawling system 202 and the information extraction system 204 may operate to obtain information from one or more information sources 230 and to update the knowledge graph 210 based on the obtained information. In FIG. 11, a set of crawlers 220 obtain (e.g., crawling and/or downloading) information relating to entities and events from various information sources 230. In embodiments, the set of crawlers 220 are controlled/directed by the crawling system 202 to identify documents that may contain information regarding entities, events, and relationships. Types of entities include, but are not limited to, organizations (e.g., companies), people, governments, cities, states, countries, dates, populations, markets, sectors, industries, roles, and products. Information about organizations may be obtained from, for example, company news articles, job postings, SEC filings, organizational charts, press releases, and any other digital documents relating to organizations such as patents, trademarks, blog posts, mentions in forums, market reports, internal documents, company websites, and social media. Information about people may be obtained from, for example, resumes (e.g., education, prior experience), scientific publications, patents, and any other digital documents such as contact information, news mentions, social media, blog posts, and personal websites.

In embodiments, the crawlers 220 can crawl Internet websites to obtain documents. Internet websites may include, but are not limited to, sites that include company news articles, job postings, SEC filings, patents, trademark registrations, copyrights, blog posts, mentions in forums, market reports, internal documents, company websites, and social media, as well as sites that include information about people, which may include, but are not limited to, education (such as schools attended, degrees obtained, programs completed, locations of schooling and the like), prior experience (including job experience, projects, participation on boards and committees, participating in industry groups, and the like), scientific publications, patents, contact information, news mentions, social media, blog posts, and personal websites. Information may be extracted from websites via a variety of techniques, including but not limited to explicit selection of specific data fields, automatic extraction of data from raw website code, or automatic extraction of data from images or video of websites. Crawlers 220 may employ various methods to simulate the behavior of human users, including but not limited to simulating computer keyboard keystrokes, simulating computer mouse movement, and simulating interaction with a browser environment. Crawlers 220 may learn to simulate interaction with websites by learning and replicating patterns in the behavior of real website users.

In operation, the crawling system 202 may seed one or more crawlers 220 with a set of resource identifiers (e.g., uniform resource identifiers (URIs), uniform resource locators (URLs), application resource identifiers, and the like). A crawler 220 may iteratively obtain documents corresponding to the seeded resource identifier (e.g., an HTML document). In particular, a crawler 220 may parse the obtained documents for links contained in the documents that include additional resource identifiers. A crawler 220 may then obtain additional documents corresponding to the newly seeded resource identifiers that were identified from the parsed documents. A crawler 220 may continue in this manner until the crawler does not find any new links. The crawler 220 may provide any obtained documents to the crawling system 202, which can in turn dedupe any cumulative document. The crawling system 202 may output the obtained documents to the information extraction system 204.

In embodiments, the information extraction system 204 may receive documents obtained from the crawlers 220 via the crawling system 202. The information extraction system 204 may extract text and any other relevant data that represents information about a company, an individual, an event, or the like. Of particular interest to users of the directed content platform 200 disclosed herein, such as marketers and salespeople, are documents that contain information about events that indicate the direction or intent of a company and/or direction or intent of an individual. These documents may include, among many others, blog posts from or about a company; articles from business news sources like Reuters™, CB Insights™, CNBC™, Bloomberg™, and others; securities filings (e.g., 10K filings in the US); patent, trademark and/or copyright filings; job postings; and the like. The information extraction system 204 may maintain and update a knowledge graph 210 based on the extracted information, as well as any additional information that may be interpolated, predicted, inferred, or otherwise derived from the extracted information and/or a proprietary database 208.

In embodiments, the information extraction system 204 (e.g., the entity extraction system 224 and the event extraction system 226) may discover and make use of patterns in language to extract and/or derive information relating to entities, events, and relationships. These patterns may be defined in advance and/or may be learned by the system 200 (e.g., the information extraction system 204 and/or the machine-learning system 212). The information extraction system 204 may identify a list of words (and sequences of words) and/or values contained in each received document. In embodiments, the information extraction system 204 may use the language patterns to extract various forms of information, including but not limited to entities, entity attributes, relationships between respective entities and/or respective events, events, event types, attributes of events from the obtained documents. The information extraction system 204 may utilize natural language processing and/or machine-learned classification models (e.g., neural networks) to identify entities, events, and relationships from one or more parsed documents. For example, a news article headline may include the text "Company A pleased to announce deal to acquire Company B." In this example, an entity classification models may be able to extract "Company A" and "Company B" as business organization entities because the classification model may have learned that the term "deal to acquire" is a language pattern that is typically associated with two companies. Furthermore, an event classification model may identify a "company acquisition event" based on the text because the event classification model may have learned that the term "deal to acquire" is closely associated with "company acquisition events." Furthermore, the event classification model may rely on the terms "Company A" and "Company B" to strengthen the classification, especially if both Company A and Company B are both entities that are known to the system 200. In embodiments, the information extraction system 204 may derive new relationships between two or more entities from a newly identified event. For example, in response to the news article indicating Company A has acquired Company B, the information extraction system 204 may infer a new relationship that Company A owns Company B. In this example, a natural language processor may process the text to determine that Company A is the acquirer and Company B is the acquisition. Using the event classification of "company acquisition event" and the results of the natural language processing, the information extraction module 204 may infer that Company B now owns Company A. The information extraction system 204 may extract additional information from the news article, such as a date of the acquisition.

In some embodiments, the information extraction system 204 may rely on a combination of documents to extract entities, events, and relationships. For example, in response to the combination of i) a publicly available resume of Person X indicating that Person X works at Company C; and ii) a press release issued by Company B that states in the body text "Company B has recently added Person X as its new CTO," the information extraction system 204 may extract the entities Person X, Company B, Company C, and CTO. The name of Person X and Company C may be extracted from the resume based on language patterns associated with resumes, while the names of Company B and Person A, and the role CTO may be extracted from the press release based on a parsing and natural language processing of the sentence quoted above. Furthermore, the information extraction system 204 may classify two events from the combination of documents based on natural language processing and a rules-based inference approach. First, the information extraction module 204 may classify a "hiring event" based on the patterns of text from the quoted sentence. Secondly, the information extraction module 204 may infer a "leaving event" with respect to Company C and Person X based on an inference that if a person working for a first company is hired by another company, then the person has likely left the first company. Thus, from the combination of documents described above, the information extraction module 204 may infer that Person X has left Company C (a first event) and that Company B has hired Person X (a second event). Furthermore, in this example, the information extraction module 204 may infer updated relationships, such as Person X no longer works for Company C and Person X now works for Company B as a CTO.

In some embodiments, the information extraction system 204 may utilize one or more proprietary databases 208 to assist in identifying entities, events, and/or relationships. In embodiments, the proprietary databases 208 may include one or more databases that power a content relationship management system (not shown), where the database stores structured data relating to leads, customers, products, and/or other data relating to an organization or individual. This structured data may indicate, for example, names of customer companies and potential customer companies, contact points at customer companies and potential customer companies, employees of a company, when a sale was made to a company (or individual) by another company, emails that were sent to a particular lead from a company and dates of the emails, and other relevant data pertaining to a CRM. In these embodiments, the information extraction system 204 may utilize the data stored in the proprietary databases 208 to identify entities, relationships, and/or events; to confirm entities, relationships, or events; and/or to refute identifications of entities, relationships, and/or events.

In embodiments, the entity extraction system 224 parses and derive entities, entity types, entity attributes, and entity relationships into a structured representation based on the received documents. The entity extraction system 224 may employ natural language processing, entity recognition, inference engines, and/or entity classification models to extract entities, entity types, entity attributes, entity relationships, and relationship metadata (e.g., dates which the relationship was created). In embodiments, the event extraction system 226 may use known parsing techniques to parse a document into individual words and sequences of words. The event extraction system 226 may employ natural language processing and entity recognition techniques to determine whether any known entities are described in a document. In embodiments, the event extraction system 226 may utilize a classification model in combination with natural language processing and/or an inference engine to discover new entities, the entities respective types, relationships between entities, and the respective types of relationships. In embodiments, the entity extraction system 224 may extract entity attributes from the documents using natural language processing and/or an inference engine. The entity extraction system 224 may employ additional or alternative strategies to identify and classify entities and their respective relationships.

In embodiments, the event extraction system 226 is configured to parse and derive information relating to events and how those events relate to particular entities. For example, news articles, press releases and/or other documents obtained from other information sources may be fed to the event extraction system 226, which may identify entities referenced in the documents based on the information contained in the news articles and other documents. The event extraction system 226 may be further configured to classify the events according to different event types (and subtypes). The event extraction system 226 may be configured to extract event attributes, such as from the headline and the body of a news article or another document, such as a press release or resume. Event types may include, but are not limited to, mergers and acquisitions, client wins, partnerships, workforce reductions or expansions, executive announcements, bankruptcies, opening and closing of facilities, stock movements, changes in credit rating, distribution of dividends, insider selling, financial results, analyst expectations, funding events, security and data breaches, regulatory and legal actions, product releases and recalls, product price changes, project initiatives, budget and operations changes, changes in name or contact, changes in how products and services are represented or described, award wins, conference participations, sponsoring activities, new job postings, promotions, layoffs, and/or charitable donations. Examples of event attributes may include entities that are connected to the event, a time/date when the event occurred, a date when the event occurred, a geographic area where the event occurred (if applicable), and the like. The event extraction system 226 may employ event classification models, natural language processing, and/or an inference engine to identify and classify events. In embodiments, the event extraction system 226 may receive entity information, including entity values (e.g. a name of a person or company, a job title, a state name) and entity types extracted by the entity extraction system 224 to assist in the event classification. In embodiments, an event classification model may receive entity information along with the features of a document to identify and classify events. Drawing from the example of Company A acquiring Company B, an event classification model may receive the entity types of Company A and Company B, the features of the document (e.g., results of parsing and/or natural language processing), as well as a source of the document (e.g. news article from a business focused publication) to determine that the sentence fragment "a deal to acquire" corresponds to a company acquisition event, as opposed a real property purchase event or a sports trade event (both of which may also correlate to "a deal to acquire"). The event extraction system 226 may employ additional or alternative strategies to identify and classify events.

In embodiments, the information extraction system 204 structures the information into structured representations of respective, entities, relationships, and events. In embodiments, the information extraction system 204 updates the knowledge graph 210 with the structured representations.

Figure 12:
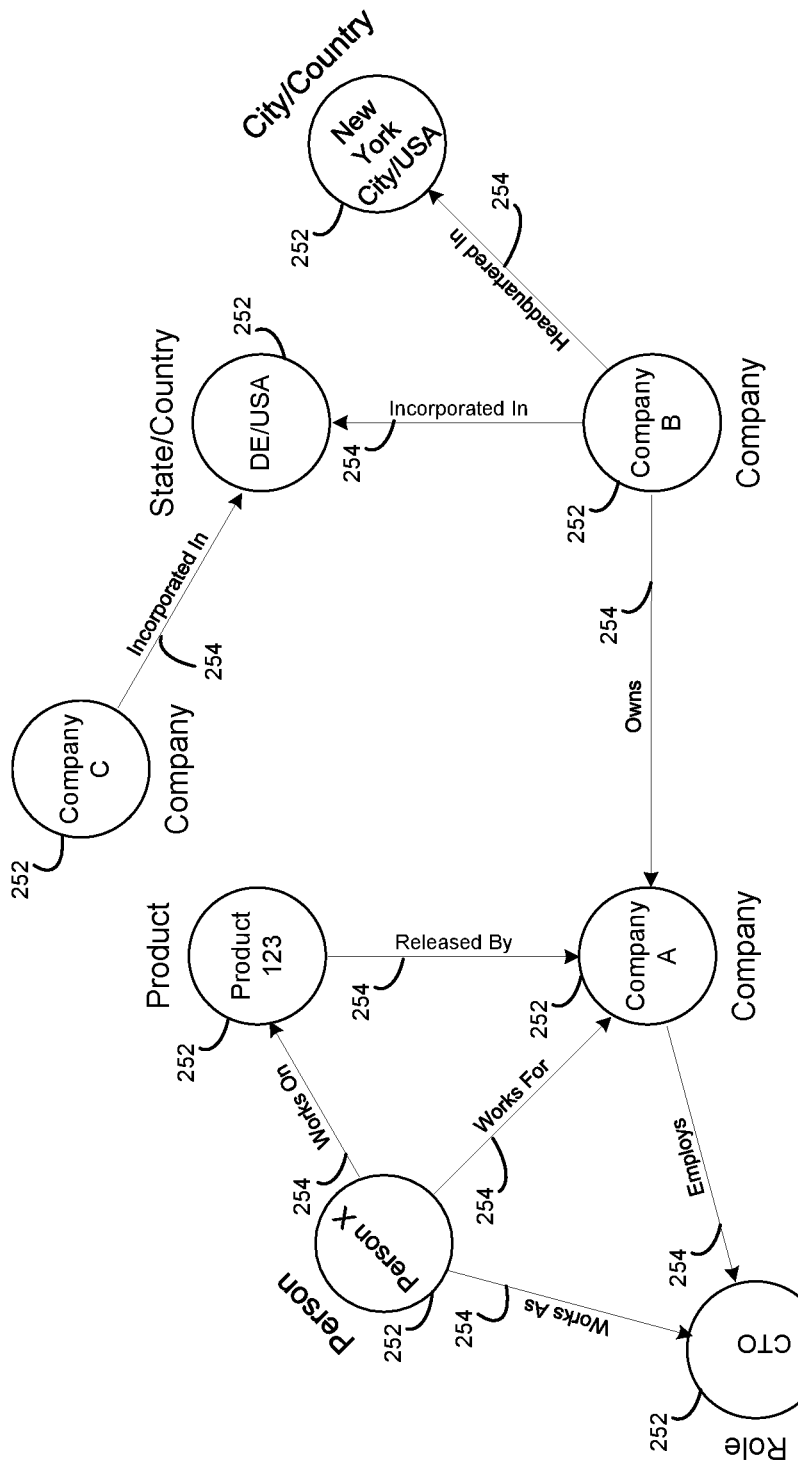
FIG. 12 depicts a visual representation of a portion of an example knowledge graph representation according to some embodiments of the present disclosure.

FIG. 12 is a visual representation of a portion of an example knowledge graph 210 representation. In embodiments structured representations in the knowledge graph may be represented by nodes and edges. In the illustrated example, the knowledge graph 210 includes entity nodes 252 that represent entities (e.g., companies, people, places, roles, and the like). In the example, the edges 254 that connect entity nodes 252 represent relationships between the entities represented by the entity nodes 252 connected by a respective edge 254.

In embodiments, each entity node 252 in the knowledge graph 210 may correspond to a specific entity that is known to the system 200 and/or identified by the entity extraction module 224. In some embodiments, each entity node is (or points to) an entity record 252 that includes information relating to the entity represented by the entity node, including an entity identifier (e.g., a unique value corresponding to the entity), an entity type of the entity node (e.g., person, company, place, role, product, and the like), an entity value of the entity (e.g., a name of a person or company), and entity data corresponding to the entity (e.g., aliases of a person, a description of a company, a classification of a product, and the like).

In embodiments, each edge 254 in the knowledge graph 210 may connect two (or more) entity nodes 252 to define a relationship between two (or more) entities represented by the entity nodes 252 connected by the edge 254. In embodiments, edges in the graph may be (or point to) relationship records 254 that respectively define a relationship identifier (a unique identifier that identifies the relationship/edge), a relationship type between two or more entities that defines the type of relationship between the connected entities (e.g., "works for," "works as," "owns," "released by," "incorporated in," "headquartered in," and the like), relationship data (e.g., an entity identifier of a parent entity node and entity identifier(s) of one or more child entity nodes), and relationship metadata (e.g., a date on which the relationship was created and/or identified). In this way, two entity nodes 252 that are connected by an edge 254 may describe the type of relationship between the two entity nodes. In the illustrated example, an entity node 252 of Company A is connected to an entity node 252 of Delaware/USA by an edge 254 that represents an "incorporated in" relationship type. In this particular instance, the entity node 252 of Company A is the parent node and the entity node 252 of Delaware/USA is the child node by way of the directed "incorporated in" edge 254.

In some embodiments, a knowledge graph 210 may further include event nodes (not shown). Event nodes may represent events that are identified by the event extraction system 226. An event node may be related to one or more entity nodes 252 via one or more edges 254, which may represent respective relationships between the event and one or more respective entities represented by the one or more entity nodes connected to the event node. In some embodiments, an event node may be (or point to) an event record 256 that corresponds to a specific event, which may define an event identifier (e.g., a unique value that identifies the event), an event type (e.g., a merger, a new hire, a product release, and the like), and event data (e.g., a date on which the event occurred, a place that the event occurred, information sources from which the event was identified, and the like).

In the case that the information extraction system 204 identifies a new entity, event, and/or relationship, the information extraction system 204 may store the structured representations of new entity, relationship, and/or event in the knowledge graph 210. In cases of known entities, events, and/or relationships, the information extraction system 204 may reconcile any newly derived data in the respective structured representations with data already present in the knowledge graph 210. Updating entities, events, and/or relationships in a knowledge graph 210 may include deleting or replacing structured relationships and/or changing data corresponding to entities, events, and/or relationships in the knowledge graph 210. Drawing from the example of Company A acquiring Company B above, the relationship between the two entities (Company A and Company B) may be represented by a parent entity node 252 of Company A, a child node 252 of Company B, and an "owns" edge 254 connecting the two entity nodes that indicates the relationship type as parent node "owns" child node. Drawing from the example of Person X, the information extraction system 204 may update the knowledge graph 210 by deleting or replacing the edge 254 defining the relationship between the entity node 252 of Person X and the entity node 252 of Company C, such that there is no longer an edge between the entity nodes of Person X and Company C or a previously defined edge (not shown) between the two entity nodes may be replaced with an edge 254 that indicates a "used to work for" relationship between the parent node of Person X and the child entity node of Company C. Furthermore, in this example, the information extraction system 204 may update the knowledge graph 210 to include a first edge 254 indicating a "works for" relationship between a parent node 252 of Person X and a child node 252 of Company B, thereby indicating that Person X works for Company B. The information extracting system 204 may further include a second edge 254 indicating a "works as" relationship between the parent node 252 of Person X and a child node 252 of a CTO Role, which may be related back to Company B by an "employs" role.

Referring back to FIG. 10, the machine learning system 212 is configured to perform machine learning tasks. Learning tasks may include, but are not limited to, training machine-learned models to perform specific tasks and reinforcing the trained models based on feedback that is received in connection with the output of a model. Examples of tasks that can be performed by machine-learned models can include, but are not limited to, classifying events, classifying entities, classifying relationships, scoring potential recipients of messages, and generating text. Depending on the task, certain types of machine learning may be better suited to a particular task than others. Examples of machine-learning techniques can include, but are not limited to, decision tree learning, clustering, neural networks, deep learning neural networks, support vector machines, linear regression, logistic regression, naïve Bayes classifiers, k-nearest neighbor, k-means clustering, random forests, gradient boosting, Hidden Markov models, and other suitable model architectures.

In embodiments, a machine learning system 212 may be configured to learn to identify and extract information about events. In some embodiments, the machine learning system 212 may be configured to train event classification models (e.g., neural networks). An event classification model may refer to a machine-learned model that is configured to receive features that are extracted from one or more documents and that output one or more potential events that may be indicated by the documents (or features thereof). Examples of features that may be extracted are words or sequences of words contained in a document or set of documents, dates that are extracted from the documents, sources of the documents, and the like.

In embodiments, the machine learning system 212 trains event classification models that identify events that indicate growth of a business, such as new job postings, financial reports indicating increased sales or market share, jobs reports indicating increased employment numbers, announcements indicating opening of new locations, and the like. Such events, because (among other reasons) they tend to be good indicators of available budgets for acquisition of goods and services, may be relevant to sales and marketing professionals of organizations who provide offerings that assist with growth, such as recruiting services, information technology systems, real estate services, office fixtures and furnishings, architecture and design services, and many others.

In embodiments, the machine learning system 212 trains event classification models that identify events that indicate changing needs of a company, such as C-level hires, layoffs, acquisitions, mergers, bankruptcies, product releases, and the like. Such events tend to be good indicators of companies that may require new services, as the changing of company needs tend to correlate to implementations of new software solutions or needs for specific types of services or employees. These types of events may be of interest to businesses such as construction companies, software companies, staffing companies, and the like.

In embodiments, the machine learning system 212 trains event classification models that identify events that tend to indicate that a business is flat, shrinking or failing, such as a decrease or lack of increase in job postings, financial reports indicating flat or decreased sales or market share, reports indicating decreased employment numbers, reports of lay-offs, reports indicating closing of locations, and the like. Such events may be relevant to sales and marketing professionals of organizations who provide offerings that assist with turnaround efforts, such as sales coaching services, bankruptcy services, and the like.

In embodiments, the machine learning system 212 trains models that are configured to parse job postings of an entity to determine the nature of an organizations hiring as an indicator of need for particular types of goods and services. Among other things, job postings tend to be fairly truthful, as inaccurate information would tend to adversely impact the process of finding the right employees. In embodiments, the machine learning system 212 may include a classifier that learns, based on a training data set and/or under human supervision, to classify job postings by type, such that the classified job postings may be associated with indicators of specific needs of an organization (which itself can be determined by a machine learning system that is trained and supervised). The needs can be stored, such as in the knowledge graph and/or in a customer relationships management or other database as described throughout this disclosure and the documents incorporated by reference herein, such as to allow a sales and marketing professional to find appropriate recipients for an offering and/or configure communications to recipients within organizations that have relevant needs.

In embodiments, the machine learning system 212 trains models that are configured to parse news articles mentioning an entity or individuals associated with an entity to find events that are indicators of need for particular types of goods and services. News articles tend to be challenging, as they are typically unstructured and may use a wide range of language variations, including jargon, shorthand, and word play to describe a given type of event. In embodiments, the machine learning system 212 may specify a frame for the kind of event that is being sought, such as a specific combination of tags that characterize the event. For example, where the machine learning system 212 needs to be configured to discover events related to a management change, a frame can be specified seeking the name of a person, a role within the management structure of a company, a company, and an action related to that role. In embodiments, parsers may be configured for each of those elements of the frame, such that on a single pass of the article the machine learning system 212 can extract names, roles (e.g., "CEO" or "VP Finance" among many others), companies (including formal names and variants like initial letters and stock symbols) and actions (e.g., "retired," "fired," "hired," "departs" and the like). In embodiments, names may include proper names of individuals (including full names, partial names, and nicknames) known to serve in particular roles, such as reflected in a customer relationship management database (such as described throughout this disclosure or in the documents incorporated by reference herein) that may be accessed by the machine learning system to assist with the parsing. The machine learning system 212, which may be trained using a training data set and/or supervised by one or more humans, may thus learn to parse unstructured news articles and yield events in the form of the frame, which may be stored in the knowledge graph, such as at nodes associated with the organization and/or the individuals mentioned in the articles. In turn, the events may be used to help sales and marketing professionals understand likely directions of an enterprise. For example, among many other examples, the hiring of a new CTO may indicate a near-term interest in purchasing new technology solutions.

The machine learning system 212 may train event classification models in any suitable manner. For example, the machine learning system 212 may implement supervised, semi-supervised, and/or unsupervised training techniques to train an event classification model. For example, the machine learning system 212 may train an event classification model using a training data set and/or supervision by humans. In some instances, the machine learning system 212 may be provided with a base event classification model (e.g., a generic or randomized classification model) and training data containing labeled and unlabeled data sets. The labeled data sets may, for example, include documents (or features thereof) that describe thousands or millions of known events having known event types. The unlabeled data sets may include documents (or features thereof) without any labels or classifications that may or may not correspond to particular events or event types. The machine learning system 212 may initially adjust the configuration of the base model using the labeled data sets. The machine learning system 212 may then try to identify events from the unlabeled data sets. In a supervised environment, a human may confirm or deny an event classification of an unlabeled data set. Such confirmation or denial may be used to further reinforce the event classification model. Furthermore, as the system 200 (e.g., the event extraction module 226) operates to extract events from information obtained by the crawling system 202, the machine learning system 212 may utilize the classification of said event classifications, the information used to make the entity classifications, and any outcome data resulting from the event classifications to reinforce the event classification model(s). Such event classification models may be trained to find various indicators, such as indicators of specific industry trends, indicators of need and the like.

In embodiments, the machine learning system 212 is configured to train entity classification models. An entity classification model may be a machine-learned model that receives one or more documents (or features thereof) and identifies entities indicated in the documents and/or relationships between the documents. An entity classification model may further utilize the knowledge graph as input to determine entities or relationships that may be defined in the one or more documents. The machine learning system 212 may train entity classification models in a supervised, semi-supervised, and/or unsupervised manner. For example, the machine learning system 212 may train the entity classification models using a training data set and/or supervision by humans. In some instances, the machine learning system 212 may be provided with a base entity classification model (e.g., a generic or randomized classification model) and training data containing labeled and unlabeled data sets. The labeled data sets may include one or more documents (or the features thereof), labels of entities referenced in the one or more documents, labels of relationships between the entities referenced in the one or more documents, and the types of entities and relationships. The unlabeled data sets may include one or more documents (or the features thereof), but without labels. The machine learning system 212 may initially train the base entity classification model based on the labeled data sets. The machine learning system 212 may then attempt classify (e.g., classify entities and/or relationships) entities and/or relationships from the unlabeled data sets. In embodiments, a human may confirm or deny the classifications output by an entity classification model to reinforce the model. Furthermore, as the system 200 (e.g., the event extraction module 226) operates to extract entities and relationships from information obtained by the crawling system 202, the machine learning system 212 may utilize the classification of said entities and relationships, the information used to make the entity classifications, and any outcome data resulting from the entity classifications to reinforce the entity classification model(s).

In embodiments, the machine learning system 212 is configured to train generative models. A generative model may refer to a machine-learned model (e.g., neural networks, deep neural networks, recurrent neural networks, convolutional networks, and the like) that is configured to learn a data-generating distribution given an objective and to output text (e.g., a message to generate a lead, a message to follow up a call, and the like) and one or more features/attributes of an intended recipient. In some embodiments, a generative model outputs sequences of three to ten words at a time. The machine learning system 212 may train a generative model using a corpus of text. For example, the machine learning system 212 may train a generative model used to generate professional messages and may be trained using a corpus of messages, professional articles, emails, text messages, and the like. For example, the machine learning system 212 may be provided messages drafted by users for intended objective. The machine learning system 212 may receive the messages, the intended objectives of the messages, and outcome data indicating whether the message was successful (e.g., generated a lead, elicited a response, was read by the recipient, and the like). As the directed content system 200 generates and sends messages and obtains outcome data relating to those messages, the machine learning system 212 may reinforce a generative model based on the text of the messages and the outcome data.

In embodiments, the machine learning system 212 is configured to train recipient scoring models. A lead scoring model 212 may be a machine-learned model (e.g., a regression or classification model) that receives features or attributes of an intended recipient of a message and a message objective and determines a lead score or category corresponding to the intended recipient. The lead score or category indicates a likelihood of a successful outcome with respect to the message. Examples of successful outcomes may include, but are not limited to, a message is viewed by the recipient, a response message is sent from the recipient, an article attached in the message is read by the recipient, or a sale is made as a result of the message. The machine learning system 212 may train the lead scoring model 212 in a supervised, semi-supervised, or unsupervised manner. In some embodiments, the machine-learning system 212 is fed a training data set that includes sets of triplets, where a triplet may include recipient attributes (e.g., employer, role, recent events, location, and the like), a message objective (e.g., start a conversation, make a sale, generate a website click), and a lead score assigned (e.g., by a human) to the triplet given the attributes and the message objective. The machine-learning system 212 may initially train a model based on the training data. As the lead scoring model is deployed and personalized messages are sent to users, the machine-learning system 212 may receive feedback data 272 from a recipient device 270 (e.g., message was ignored, message was read, message was read and responded to) to further train the scoring model.

The machine learning system 212 may perform additional or alternative tasks not described herein. Furthermore, while the machine learning system 212 is described as training models, in embodiments, the machine learning system 212 may be configured to perform classification, scoring, and content generation tasks on behalf of the other systems discussed herein.

Figure 13:
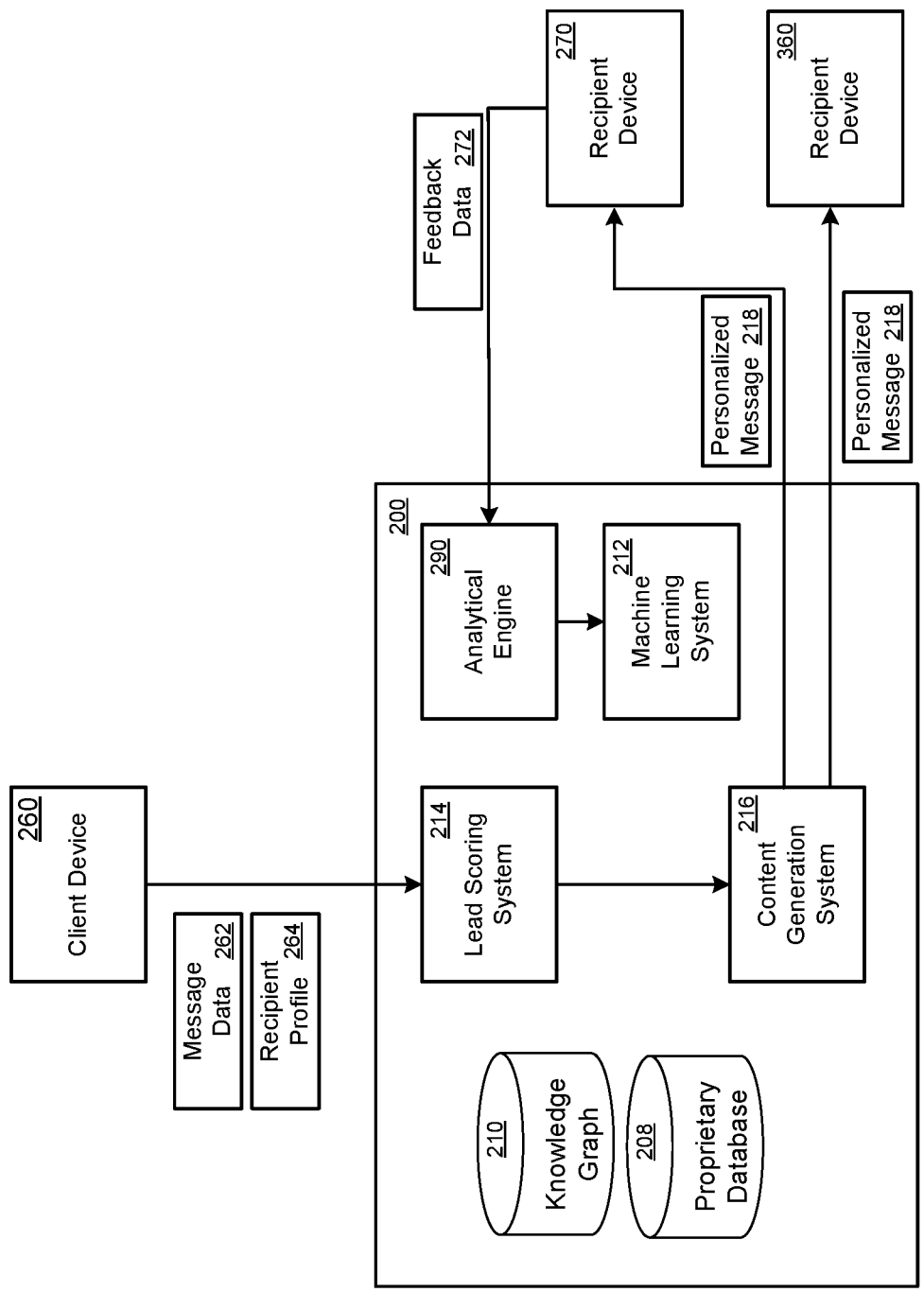
FIG. 13 illustrates an example configuration of the lead scoring system and the content generation system for identifying intended recipients of messages and generating personalized messages for the one or more intended recipients.

FIG. 13 illustrates an example configuration of the lead scoring system 214 and the content generation system 216 for identifying intended recipients of messages and generating personalized messages 218 for the one or more intended recipients. Traditionally, marketers and sales people rely on bulk emails that are created by populating contact information from a database into a block of free text that has fields for elements that will be retrieved from the database and inserted into the text at the position of the fields. For example, an email template may say "Hi {First name}, . . . .", and first names from the database will be inserted at the point of the {First name} field. The methods and systems disclosed herein enable substantial improvement and enhancement of such templated emails by making available, at large scale, a range of information that is not typically available during bulk email generation. This includes publicly available information about recipients that may serve to personalize or customize the email in a way that makes the message more likely to have a positive outcome (e.g., opened, responded to, closes a deal, and the like).

The lead scoring system 214 and the content generation system 216 may utilize the knowledge graph 210 and/or the proprietary databases 208, as well as message data 262 and a recipient profile 264 to identify intended recipients and to generate personalized messages 218 for the intended recipients. A personalized message 218 may refer to a message that includes content that is specific to the intended recipient or the organization of the intended recipient. It is noted for purposes of distinguishing from traditional templated bulk messages, merely including a recipient's name, address, or organization name in one or more template fields does not constitute a personalized message 218 in-and-of-itself.

In embodiments, message data 262 may refer to any information that relates to the messages that a user wishes to have sent. In embodiments, message data 262 may include an objective of the email. For example, the objective an email may be to open a dialogue, make a sale, renew a subscription, have a recipient read an article, and the like. As is discussed below, the message data 262 may be received from a user via a client device 260 and/or may be generated for the user by the systems described herein. In embodiments, message data may include a message template that includes content that is to be included in the body of the message. For example, a message template may include the name of the "sender," a description of the sender's business, a product description, and/or pricing information. A message template may be created by the user (e.g., using the content management system disclosed elsewhere herein) or may be retrieved by the user and sent from the client device. A message template may include fields to be filled by the content generation system 216 with information, including content that is generated by the content generation system 216 based on information selected from the knowledge graph 210. In some embodiments, the system may automatically infer or generate message templates from historical data provided by the user and/or other users of the system 200. Historical data may include, but is not limited to, historical communication data (e.g., previously sent messages) and/or historical and current customer relationship data, such as the dates, amounts, and attributes of business transactions. In some embodiments, the system 200 may further rely on the objective of a message to generate the template.

In embodiments, a recipient profile 264 may include, among many other examples, information about an ideal recipient, including but not limited to work location, job title, seniority, employer size, and employer industry. A recipient profile 264 may be provided by a user via a client device 260 and/or may be determined using machine-learning based on an objective of the message or other relevant factors. In the latter scenario, the machine-learning system 212 may determine which types of information are relevant for predicting whether a recipient will open and/or respond to a message. For example, the machine-learning system 212 may determine receive feedback data 272 from recipient devices 270. Feedback data 272 may indicate, for example, whether a message was opened, whether a link in the message was clicked, whether an attachment in the message was downloaded or viewed, whether a response was elicited, and the like.

In some scenarios, a user may have a good sense of the type of recipient that the user believes would be interested in the user's offering. For example, a user may wish to sell a new software suite to CTOs of certain types of organizations (e.g., hospitals and health systems). In such cases, a user may optionally input a recipient profile 264 and message data 262 into the system 200 via a client device 260. In additional or alternative embodiments, a recipient profile 264 may be generated by machine learned models based on, for example, outcomes relating to personalized messages previously generated by the system 200 and/or the objective of the message.

In embodiments, the lead scoring system 214 is configured to identify a list of one or more intended recipients of a message based on the recipient profile 264 (whether specified by a user or generated by machine learning). In embodiments, the lead scoring system 214 may filter the most relevant entities in the knowledge graph 210 using the ideal recipient profile and create a recipient list. The recipient list may indicate a list of people that fit the recipient profile. In some embodiments, the lead scoring system 214 may determine a lead score for each person in the recipient list, whereby the lead score indicates a likelihood that a personalized message 218 sent to that person will lead to a successful outcome. In embodiments, the lead scoring system 214 may use historical and current data provided by the user and/or other users of the system to assess the probability that each recipient in the recipient list will respond to the user's message, and/or will be interested in knowing more about the user's offering, and/or will purchase the user's offering. The historical and current data used to evaluate this likelihood may include the events and conditions experienced by recipients and their employers around the time they made similar decisions in the past, the timing of those events, and their co-occurrence.

In some implementations, the lead scoring system 214 retrieves information relating to each person indicated in the recipient list from the knowledge graph 210. The information obtained from the knowledge graph 210 may include information that is specific to that person and/or to the organization of the user. For example, the lead scoring system 214 may obtain a title of the person, an education level of the person, an age of the person, a length of employment by the person, and/or any events that are associated with the person or the organization of the person. The lead scoring system 214 may input this information to the lead scoring model, which outputs a lead score based thereon. The lead scoring system 214 may score each person in the recipient list. The lead scoring system 214 may then rank and/or filter the recipient list based, at least in part, on the lead scores of each respective person in the list. For example, the lead scoring system 214 may exclude any people having lead scores falling below a threshold from the recipient list. The lead scoring system 214 may output the list of recipients to the content generation system 216.

In embodiments, determining which recipients (referred to in some cases as "leads") should receive a communication may be based on one or more events extracted by the information extraction system 204. Examples of these types of events may include, but are not limited to, job postings, changes in revenue, legal events, changes in management, mergers, acquisitions, corporate restructuring, and many others. For a given recipient, the lead scoring system 214 may seek to match attributes of an individual (such as a person associated with a company) to an extracted event. For example, in response to an event where Company A has acquired Company B, the attributes of an individual that may match to the event may be "works for Company B," "Is a C-level or VP level executive," and "Lives in New York City." In this example, a person having these attributes may be receptive to a personalized message 218 from an executive headhunter. In this way, the lead scoring system 214 may generate the list of intended users based on the matches of attributes of the individual to the extracted event. In some embodiments, the lead scoring system 214 may generate the list of the intended users based on the matches of attributes of the individual to the extracted event given the subject matter and/or objective of the message.

In embodiments, a content generation system 216 receives a recipient list and generates a personalized message 218 for each person in the list. The recipient list may be generated by the lead scoring system 214 or may be explicitly defined by the user. The content generation system 216 may employ natural language generation techniques and/or a generative model to generate directed content that is to be included in a personalized message. In embodiments, the content generation system 216 may generate directed content for each intended recipient included in the recipient list. In generating directed content for a particular individual, the content generation system 216 may retrieve information that is relevant to individual from the knowledge graph 210 and may feed that information into a natural language generator and/or a generative model. In this way, the content generation system 216 may generate one or more instances of directed content that is personalized for the user. For example, the content generation system 216 for an individual that was recently promoted at a company that recently went public may include the following instances of directed content: "Congratulations on the recent promotion!" and "I just read about your company's IPO, that's great news!" In embodiments, the content generation system 216 may merge the directed content with any parts of the message that is to be common amongst all personalized messages. In some of these embodiments, the content generation system 216 may merge the directed content for a particular intended recipient with a message template to obtain a personalized message for the particular intended recipient. In embodiments, the content generation system 216 may obtain the proper contact information of an intended recipient and may populate a "to" field of the message with the proper contact information. Upon generating a personalized message, the content generation system 216 may then output the personalized message. Outputting a personalized message may include transmitting the personalized message to an account of the intended recipient (e.g., an email account, a phone number, a social media account, and the like), storing the personalized message in a data store, or providing the personalized message for display to the user, where the user can edit and/or approve the personalized message before transmission to the intended recipient. A respective personalized message 218 may be delivered to a recipient indicated in the recipient list using a variety of messaging systems including, but not limited to, email, short message service, instant messaging, telephone, facsimile, social media direct messages, chat clients, and the like.

In embodiments, the content generation system 216 may utilize certain topics of information when generating directed content that can be included in an email subject line, opening greeting, and/or other portions of a message to make a more personal message for a recipient. For example, the content generation system 216 may utilize topics such as references to the recipient's past (such as to events the recipient attended, educational institutions the recipient attended, or the like), to the recipient's relationships (such as friends or business relationships), to the recipient's affinity groups (such as clubs, sports teams, or the like), and many others. In a specific example, the content generation system 216 may generate directed content that references the recipient's college, note that the sender observed that the recipient attended a recent trade show, and ask how the recent trade show went. In embodiments, the content generation system 216 may retrieve information from the knowledge graph 210 regarding an intended recipient and may provide that information to a natural language generator to obtain directed content that may reference topics that a recipient may be receptive to. In embodiments, the machine-learning system 212 can learn which topics are most likely to lead to successful outcomes. For example, the machine learning system 212 may monitor feedback data 272 to determine which messages are being opened or responded to versus which messages are being ignored. The machine learning system 212 use such feedback data 272 to determine topics which are more likely to lead to successful outcomes.

Events of particular interest to sales people and marketers may include events that indicate a direction of the recipient's business, such as the hiring of a C-level executive, the posting of job openings, a significant transaction of the business (such as a merger or acquisition), a legal event (such as the outcome of a litigation, a foreclosure, or a bankruptcy proceeding), and the like. Acquiring such information from public sources at scale is challenging, as sources for the information are often unstructured and ambiguous. Accordingly, a need exists for the improved methods and systems provided herein for retrieving information from public sources at scale, recognizing information that may be relevant or of interest to one or more recipients, developing an understanding the information, and generating content for communication to one or more recipients that uses at least a portion of the information.

Building the knowledge graph 210 may be an automated or semi-automated process, including one where machine learning occurs with supervision and where content derived from crawled documents is merged for an entity once confidence is achieved that the content in fact relates to the entity. As the knowledge graph 210 grows with additional content, the presence of more and more content enriches the context that can be used for further matching of events, thus improving the ability to ascribe future events accurately to particular entities and individuals. In embodiments, one or more knowledge graphs 210 of individuals and entities may be used to seed the knowledge graph 210 of the system 200, such as a knowledge graph 210 from a CRM database, or a publicly available database of organizations and people, such as Freebase™, Yago™, DBPedia™, OpenCyc™, WikiData™, the Linked Open Data Cloud™, or the like. In embodiments, if a user realizes that an article is not really about the company they expected, the user can flag the error; that is, the process of linking articles to entities can be human-supervised.

Using the above methods and systems, a wide range of content, such as news articles and other Internet content, can be associated in a knowledge graph 210 with each of a large number of potential recipients, and the recipients can be scored based on the matching of attributes in the knowledge graph 210 to desired attributes of the recipients reflected in the recipient profile 264. For example, all CTOs and VPs of engineering who have started their jobs in the last three months can be scored as the most desired recipients of a communication about a new software development environment, and a relevant article can be associated with each of them in the knowledge graph 210.

Once a set of recipients is known, the system 200 may assist with generation of relevant content, such as targeted emails, chats, text messages, and the like. In such cases, the system composes a personalized message 218 for each recipient in the recipient list by combining a selected message template with information about the recipient and the recipient's organization that is stored in the knowledge graph 210. The information about a recipient and/or the recipient's organization may be inserted into a message template using natural language generation and/or a generative model to obtain the personalized message. The content generation system 216 may use statistical models of language, including but not limited to automatic summarization of textual information to generate directed content based on the information about the recipient and/or the recipient's organization. In embodiments, the content generation system 216 may merge the directed content into a message template to obtain the personalized message for a recipient.

In embodiments, a range of approaches, or hybrids thereof, can be used for natural language generation. In some cases, the knowledge graph 210 may be monitored and maintained to ensure that the data contained therein is clean data. Additionally, or alternatively, the content generation system 216 can be configured to use only very high confidence data from the knowledge graph 210 (e.g., based on stored indicators of confidence in respective instances of data). Being clean for such purposes may include the data being stored as a certain part of speech (e.g., a noun phrase, a verb of a given tense, or the like). Being clean may also include being stored with a level of confidence that the data is accurate, such as having an indicator of confidence that it is appropriate to use abbreviations of a business name (e.g., "IBM" instead of "International Business Machines"), that is appropriate to use abbreviated terms (e.g., "CTO" instead of "Chief Technology Officer"), or the like. In embodiments, where data in the knowledge graph 210 may not be of sufficient structure or confidence, a generative model may be used to generate tokens (e.g., words and phrases) from the content (e.g., information from news articles, job postings, website content, etc.) in the knowledge graph 210 associated with an organization or individual, whereby the model can be trained (e.g., using a training set of input-output pairs) to generate content, such as headlines, phrases, sentences, or longer content that can be inserted into a message.

In embodiments, each respective personalized message may be sent with a message tracking mechanism to a respective recipient of the recipient list. A message tracking mechanism may be a software mechanism that causes transmission of feedback data 272 to the system 200 in response to a certain triggering action. For example, a message tracking mechanism may transmit a packet indicating an identifier of the personalized message and a timestamp when the recipient opens the email. In another example, a message tracking mechanism may transmit a packet indicating an identifier of the personalized message and a timestamp when a recipient downloads an attachment or clicks on a link in the personalized message. In embodiments this may be accomplished by using a batch email system as described in U.S. patent application Ser. No. 15/884,247 (published as: US 20180219818 A1, entitled: QUALITY-BASED ROUTING OF ELECTRONIC MESSAGES, and filed: Jan. 30, 2018); U.S. patent application Ser. No. 15/884,251 (published as: US 20180219829 A1, entitled: ELECTRONIC MESSAGE LIFECYCLE MANAGEMENT, and filed: Jan. 30, 2018); U.S. patent application Ser. No. 15/884,264 (published as: US 20180219819 A1, entitled: MANAGING ELECTRONIC MESSAGES WITH A MESSAGE TRANSFER AGENT, and filed: Jan. 30, 2018); U.S. patent application Ser. No. 15/884,268 (published as: US 20180219820 A1, entitled: MITIGATING ABUSE IN AN ELECTRONIC MESSAGE DELIVERY ENVIRONMENT, and filed: Jan. 30, 2018), U.S. patent application Ser. No. 15/884,273 (published as: US 20180219830 A1, entitled: INTRODUCING A NEW MESSAGE SOURCE INTO AN ELECTRONIC MESSAGE DELIVERY ENVIRONMENT, and filed: Jan. 30, 2018), and PCT Application Serial Number PCT/US18/16038 (published as: WO 2018/140975, entitled: PLATFORM FOR ELECTRONIC MESSAGE PROCESSING, and filed: Jan. 30, 2018), the contents of which are all herein incorporated by reference. In embodiments, feedback data 272 may include additional or alternative types of data, such as message tracking information and language that was used in a response (if such response occurred).

In embodiments, the feedback data 272 corresponding to personalized messages sent by the system 200 and potential responses to the personalized messages 218 may be received by the system and analyzed by an analytical engine 290. The analytical engine 290 may utilize the feedback data 272 to identify feedback data 272 corresponding to the personalized messages 218 sent by the system 200 and potential responses to those personalized messages 218 may include, but is not limited to, whether the message 218 was opened, whether an attachment was downloaded, whether a message was responded to, tracking information, language of a potential response from the recipient, and any other information contained explicitly or implicitly in the message communications such as the time and day the message was sent, opened and replied to, and the location where the message was read and replied to. The analytical engine 290 may perform language and/or content tests on the feedback data 272. Language and content tests may include, but are not limited to, A/B testing, cohort analysis, funnel analysis, behavioral analysis, and the like. The results from the analytical engine 290 may be presented to the user. The presentation of the results can be achieved using a variety of methods including, but not limited to, a web-based dashboard, reports or summary emails. In presenting the results of the analytical engine 290 with respect to a set of personalized messages sent on behalf of a user to the user, the user may then take appropriate actions to refine his or her recipient profile 264 and/or message template 262. In embodiments, the system 200 may take appropriate actions by modifying future personalized message using the results of language and content tests. The system 200 may furthermore take appropriate actions to refine the ideal recipient profile.

In embodiments, the analytical engine 290 may pass the feedback data 272 to the machine learning system 212, which may use the feedback data 272 to reinforce one or more models trained by the machine learning system 212. In this way, the machine learning system 212 can determine what types of recipients correlate to higher rates of successful outcomes (e.g., are more likely to open and/or respond to a personalized message), what type of events correlate to higher rates of successful outcomes, what time frames after an event correlate to higher rates of successful outcomes, what topics in the directed content correlate to higher rates of successful outcomes, and the like.

As noted above, the system 200 may be used to help sales people and marketers, such as to send automatically generated emails promoting an offering, where the emails are enriched with information that shows awareness of context and includes information of interest to recipients who match a given profile. The emails are in particular enriched with text generated from a knowledge graph 210 in which relevant information about organizations and individuals, such as event information, is stored. In embodiments the system 200 generates subject lines, blog post titles, content for emails, content for blog posts, or the like, such as phrases of a few words, e.g. about 5 words, about 6-8 words, about 10 words, about 15 words, a paragraph, or more, up to and including a whole article of content. In other cases, shorter content may be generated, as noted above, by training a system to generate phrases based on training on a set of input-output pairs that include event content as inputs and summary words and phrases as outputs. As an example, company descriptions have been taken from LinkedIn™ and used to generate conversational descriptions of companies. Inputs varied by company, as the nature of the data was quite diverse. Outputs were configured to include a noun-phrase and a verb-phrase, where the verb phrase was constrained to be in a given tense. In embodiments, a platform and interface is provided herein in which one or more individuals (e.g., curators), may review input text (such as of company websites, news articles, job postings, and other content from the knowledge graph 210) and the individuals can enter output text summarizing the content of the inputs in the desired form (noun phrase, verb phrase). The platform may enable the user to review content from the knowledge graph as well as to search an information network, such as a CRM system or the Internet, to find additional relevant information. In embodiments, the CRM system may include access to data about recipients maintained in a sales database, a marketing database, a service database, or a combination thereof, such that individuals preparing output text (which in turn is used to train the natural language generation system) have access to private information, such as about conversations between sales people and individuals in the recipient list, past communications, and the like.

In embodiments, training data from the platform may be used to train a model to produce generated text, and the curators of the platform may in turn review the text to provide supervision and feedback to the model.

In embodiments, the system 200 may include automated follow-up detection, such that variants of language generated by the model may be evaluated based on outcomes, such as responses to emails, chats and other content, deals won, and the like. Thus, provided herein is a system wherein the outcome of a transaction is provided as an input to train a machine learning system to generate content targeted to a recipient who is a candidate to undertake a similar transaction.

In embodiments, outcome tracking can facilitate improvement of various capabilities of the system 200, such as information extraction, cleansing of content, generation of recipient profiles, identification of recipients, and generation of text. In embodiments, text generation may be based on the nature of the targeted recipient, such as based on attributes of the recipient's organization (such as the size of the organization, the industry in which it participates, and the like). In embodiments, a machine learning system may provide for controlled text generation, such as using a supervised approach (as described above with summarization) and/or with an unsupervised or deep learning approach. In embodiments, the system may train a model to learn to generate, for example, blog post titles, email subject lines, or the like, conditioned on attributes like the industry of the recipient, the industry of a sales or marketing person, or other attributes. In embodiments, different language variants may be generated, such as text of different lengths, text of different complexity, text with different word usage (such as synonyms), and the like, and a model may be trained and improved on outcomes to learn to generate text that is most likely to achieve a favorable outcome, such as an email or blog post being read, a reply being received, content being clicked upon, a deal won, or the like. This may include A/B type testing, use of genetic algorithms, and other learning techniques that include content variation and outcome tracking. In embodiment, content may be varied with respect to various factors such as verb tense, sentiment, and/or tone. For example, verb tense can be varied by using rule-based generation of different grammatical tenses from tokens (e.g., words and phrases) contained in content attached to a node in a knowledge graph 210. In another example, sentiment can be varied by learning positive and negative sentiment on a training set of reviews or other content that has a known positive or negative sentiment, such as numerically numbered or "starred" reviews on e-commerce sites like Amazon™ or review sites like Yelp™. In another example, tone can be varied by learning on text that has been identified by curators as angry, non-angry, happy, and the like. Thus, variations of text having different length, tense, sentiment, and tone can be provided and tracked to determine combinations that produce favorable outcomes, such that the content generation system 216 progressively improves in its ability to produce effecting content for communications.

In various embodiments using no supervision (e.g., unsupervised learning), as soon as the system 200 has anything as an output, the system 200 can begin collecting labels, which in turn can be used for learning. In embodiments, the system can train an unsupervised model to create a heuristic, then apply supervision to the heuristic.

In embodiments, outcome tracking may include tracking content to determine what events extracted by the information extraction system, when used to generate natural language content for communications, tend to predict deal closure or other favorable outcomes. Metrics on deal closure may be obtained for machine learning from a CRM system, such as one with an integrated sales, marketing and service database as disclosed herein and in the documents incorporated by reference.

In embodiments, the system 200 may include variations on timing of events that may influence deal closure; that is, the system 200 may consider combinations of events, including the event type, attributes of the event, spacing, frequency, and other parameters, in order to determine when an event of a given type is likely to have what kind of influence on a particular type of outcome (e.g., a deal closure). This may include events extracted by the information extraction system 204 from public sources and events from, for example, a CRM system, an email interaction tracking system, a content management system, or the like. For example, the time period during which a CTO change has an influence on purchasing behavior can be evaluated by testing communications over different time intervals, such that the system 200 learns what events, over what time scales, are worth factoring in for purposes of collecting information, storing information in a knowledge graph 210 (as "stale" events can be discarded), using information to generate content, targeting recipients, and forming and sending communications to the recipients. Outcome tracking can include tracking interaction information with email systems, as described in the documents incorporated herein by reference. As examples, the machine learning system 212 may learn what communications to send if a prospect has opened up collateral several times in a six-month space, how the cadence of opening emails or a white paper corresponds to purchasing decisions, and the like. As another example, if an event indicates a change in a CTO, the event may be tracked to discover a rule or heuristic, such as that a very recent (e.g., within two months) CTO change might indicate difficulty closing a deal that was in the pipeline, while a change that is not quite as recent (e.g., between five and eight months before) might indicate a very favorable time to communicate about the same offering. Thus, methods and systems are provided for learning time-based relevance of events for purposes of configuration of communications that include content about the events to recipients of offers. In embodiments, the system 200 may vary time windows, such as by sliding time windows of varying duration (e.g., numbers of weeks, months, or the like) across a starting and ending period (e.g., one-year, some number of months, multiple years, or the like), before or after a given date, such as a projected closing date for a deal, or the like. The system 200 can then see what happened at each point of time and adjust the sizes of time windows for information extraction, recipient targeting, message generation, and other items that are under control of the system 200, including under control of machine learning. Thus, the system can run varying time windows against a training set of outcomes (such as deal outcomes from a CRM system as disclosed herein) to tune the starting point and duration of a time windows around each type of event, in order to learn what events are useful over what time periods.

As noted above, win-loss data and other information from a CRM system may be used to help determine what data is useful, which in turn avoids unnecessary communication to recipients who are not likely to be interested. Thus, an event timing data set is provided, wherein varying time windows are learned for each event to determine the effect of the event on outcomes when the event is associated with communications about offerings. Outcomes can include wins and losses of deals (such as for many different elements of the systems), messages opened (such as for learning to generate subject lines of emails), messages replied to (such as for learning to generate suitable content), and the like. In embodiments, time windows around events may, like other elements, be learned by domain, such as where the industry involved plays a role. For example, the same type of event, like a CTO change, may be relevant for very different time periods in different industries, such as based on the duration of the typical sales cycle in the industry.

In embodiments, learning as described herein may include model-based learning based on one or more models or heuristics as to, for example: what types of events and other information are likely to be of interest or relevance for initiating or continuing conversations; what recipients should be targeted and when, based on industry domain, type of event, timing factors, and the like; what content should be included in messages; how content should be phrased; and the like. Learning may also include deep learning, where a wide range of input factors are considered simultaneously, with feedback from various outcomes described throughout this disclosure and in the documents incorporated by reference herein. In embodiments, learning may use neural networks, such as feed forward neural networks, classifiers, pattern recognizers, and others. For generative features, such as natural language generation, one or more recurrent neural networks may be used. The system may run on a distributed computing infrastructure, such as a cloud architecture, such as the Amazon Web Services™ (AWS™) architecture, among others.

In embodiments, content generated using the system, such as directed content enriched with information extracted by the information extraction system and stored in the knowledge graph, may be used for a variety of purposes, such as for email marketing campaigns, for populating emails, chats and other communications of sales people, for chats that relates to sales, marketing, service and the like, for dialog functions (such as by conversational agents), and the like. In embodiments, content is used in conjunction with a content management system, a customer relationship management system, or the like, as described throughout this disclosure and in the documents incorporated by reference herein.

In embodiments, methods and systems disclosed herein may be used for sales coaching. Conventionally a supervisor may review a sales call or message with a sales person, such as by playing audio of a call or reviewing text of an email. In embodiments, audio may be transcribed and collected by the information extraction system disclosed herein, including to attach the transcript to a knowledge graph. The transcript may be used as a source of content for communications, as well as to determine scripts for future conversations. As noted above with respect to variations in language, variations in the script for a sales call may be developed by the natural language generation system, such as involving different sequences of concepts, different timing (such as by providing guidance on how long to wait for a customer to speak), different language variations, and the like. Machine learning, such as trained on outcomes of sales conversations, may be used to develop models and heuristics for guiding conversations, as well as to develop content for scripts.

In embodiments, the system 200 may be used to populate a reply to an email, such as by parsing the content of the email, preparing a reply and inserting relevant content from the knowledge graph in the reply, such as to customize a smart reply to the context, identity, organization, or domain of the sender. This may include allowing a recipient to select a short response from a menu, as well as enriching a short response with directed content generated by the content generation system 216 using the knowledge graph 210.

In embodiments, the system 200 may be used in situations where a user, such as a sales, marketing, or service person, has a message template, and the system is used to fill in an introductory sentence with data that comes from a node 252 of the knowledge graph 210 that matches one or more attributes of the targeted recipient. This may include taking structured data from the knowledge graph 210 about organizations and populating a sentence with appropriate noun phrases and verb phrases (of appropriate tense).

In embodiments the system 200 may provide an activity feed, such as a recommended list of recipients that match timely event information in the knowledge graph 210 based on a preexisting recipient profile or based on a recipient profile generated by the system as described above. The system may recommend one or more templates for a given recipient and populate at least some of the content of an email to the recipient. In embodiments involving email, the system 200 may learn, based on outcomes, such as deals won, emails opened, replies, and the like, to configure email content, to undertake and/or optimize a number of relevant tasks that involve language generation, such as providing an optimal subject line as a person types an email, suggesting a preferred length of an email, and the like. The system 200 may look at various attributes of generated language in optimizing generation, including the number of words used, average word length, average phrase length, average sentence length, grammatical complexity, tense, voice, word entropy, tone, sentiment, and the like. In embodiments, the system 200 may track outcomes based on differences (such as a calculated edit distance based on the number and type of changes) between a generated email (or one prepared by a worker) and a template email, such as to determine the extent of positive or negative contribution of customizing an email from a template for a recipient.

In embodiments, the system 200 may be used to generate a smart reply, such as for an automated agent or bot that supports a chat function, such as a chat function that serves as an agent for sales, marketing or service. For example, if representatives typically send out a link or reference in response to a given type of question from a customer within a chat, the system 200 can learn to surface the link or reference to a service person during a chat, to facilitate more rapidly getting relevant information to the customer. Thus, the system 200 may learn to select from a corpus a relevant document, video, link or the like that has been used in the past to resolve a given question or issue.

In embodiments, the system 200 may automatically detect inappropriate conduct, such as where a customer is engaged in harassing behavior via a chat function, so that the system prompts (or generates) a response that is configured to draw the inappropriate conversation to a quick conclusion, protecting the representative from abuse and avoiding wasting time on conversations that are not likely to lead to productive results.

In embodiments, the system 200 may be used to support communications by service professionals. For example, chat functions are increasingly used to provide services, such as to help customers with standard activities, like resetting passwords, retrieving account information, and the like. In embodiments, the system 200 may serve a relevant resource, such as from a knowledge graph, which may be customized for the recipient with content that is relevant to the customer's history (such as from a CRM system) or that relates to events of the customer's organization (such as extracted by the information extraction system).

In embodiments, the system 200 may provide email recommendations and content for service professionals. For example, when a customer submits a support case, or has a question, the system may use events about their account (such as what have the customer has done before, product usage data, how much the customer is paying, and the like), such as based on data maintained in a service support database (which may be integrated with a sales and marketing database as described herein), in order to provide recommendations about what the service professional should write in an email (such as by suggesting templates and by generating customized language for the emails, as described herein). Over time, service outcomes, such as ratings, user feedback, measures of time to complete service, measures of whether a service ticket was opened, and others may be used to train the system 200 to select appropriate content, to generate appropriate language and the, in various ways described throughout this disclosure. Outcomes may further include one or more indicators of solving a customer's problem, such as the number of responses required (usually seeking to keep them low); presence or absence of ticket deflection (i.e., avoiding unnecessary opening of service tickets by providing the right answer up front); the time elapsed before solution or resolution of a problem; user feedback and ratings; the customers net promotor score for the vendor before and after service was provided; one or more indices of satisfaction or dissatisfaction; and the like.

Figure 14:
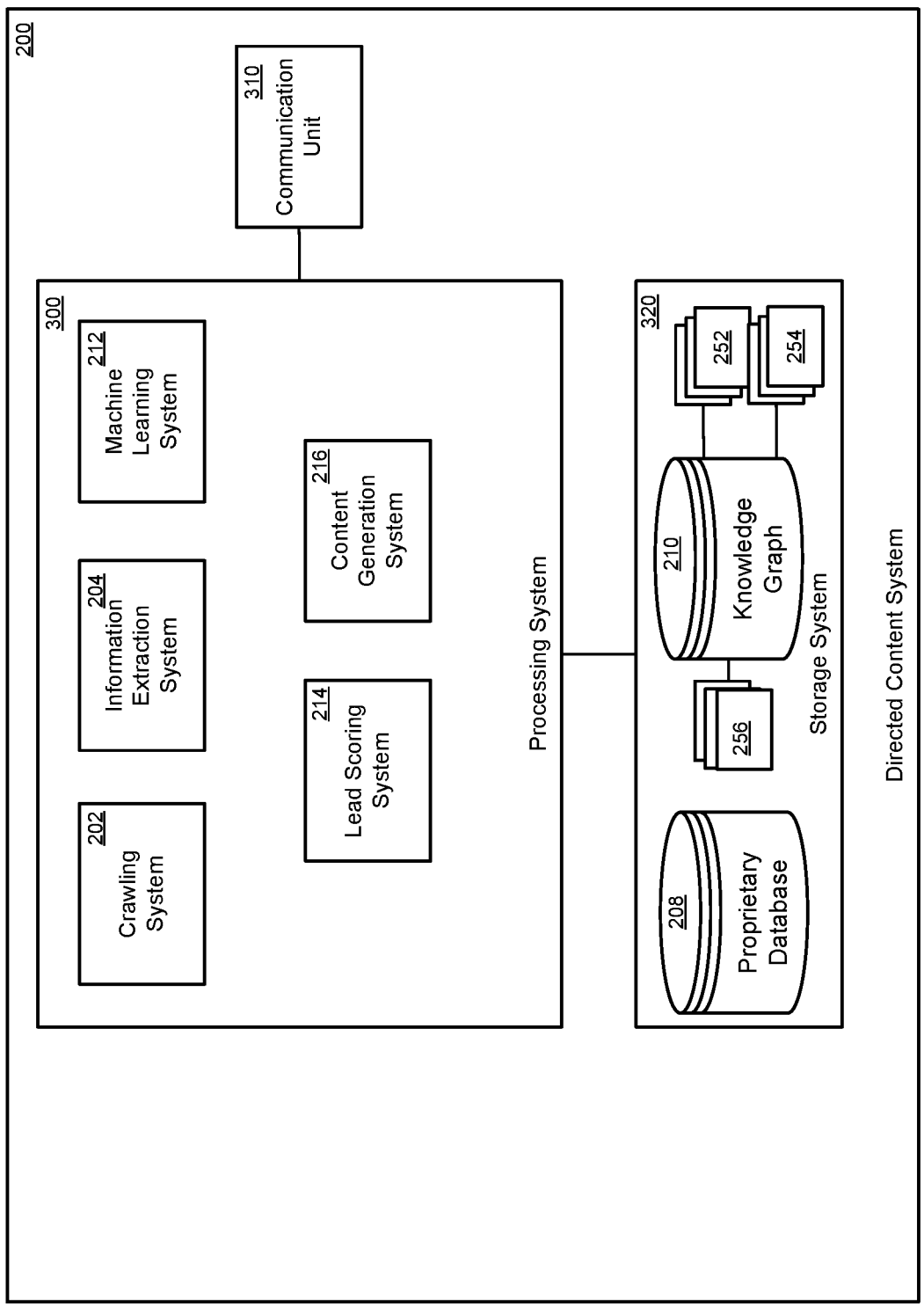
FIG. 14 illustrates an example configuration of the directed content system according to some embodiments of the present disclosure.

FIG. 14 illustrates an example configuration of the directed content system 200. In the illustrated example, the directed content system 200 includes a processing system 300, a communication system 310, and a storage system 320.

The processing system 300 includes one or more processors that execute computer-readable instructions and non-transitory memory that stores the computer-readable instructions. In implementations having two or more processors, the two or more processors can operate in an individual or distributed manner. In these implementations, the processors may be connected via a bus and/or a network. The processors may be located in the same physical device or may be located in different physical devices. In embodiments, the processing system 300 may execute the crawling system 202, the information extraction system 204, the machine learning system(s) 212, the lead scoring system 214, and the content generation system 216. The processing system 300 may execute additional systems not shown.

The communication system 310 may include one or more transceivers that are configured to effectuate wireless or wired communication via a communication network 280. The communication system 310 may implement any suitable communication protocols. For example, the communication system 310 may implement, for example, the IEEE 801.11 wireless communication protocol and/or any suitable cellular communication protocol to effectuate wireless communication with external devices via a wireless network. Additionally, or alternatively, the communication system 310 may be configured to effectuate wired communication. For example, the communication system 310 may be configured to implement a LAN communication protocol to effectuate wired communication.

The storage system 320 includes one or more storage devices. The storage devices may be any suitable type of computer readable mediums, including but not limited to read-only memory, solid state memory devices, hard disk memory devices, Flash memory devices, one-time programmable memory devices, many time programmable memory devices, RAM, DRAM, SRAM, network attached storage devices, and the like. The storage devices may be connected via a bus and/or a network. Storage devices may be located at the same physical location (e.g., in the same device and/or the same data center) or may be distributed across multiple physical locations (e.g., across multiple data centers). In embodiments, the storage system 320 may store one or more proprietary databases 208 and one or more knowledge graphs 210.

Figure 15:
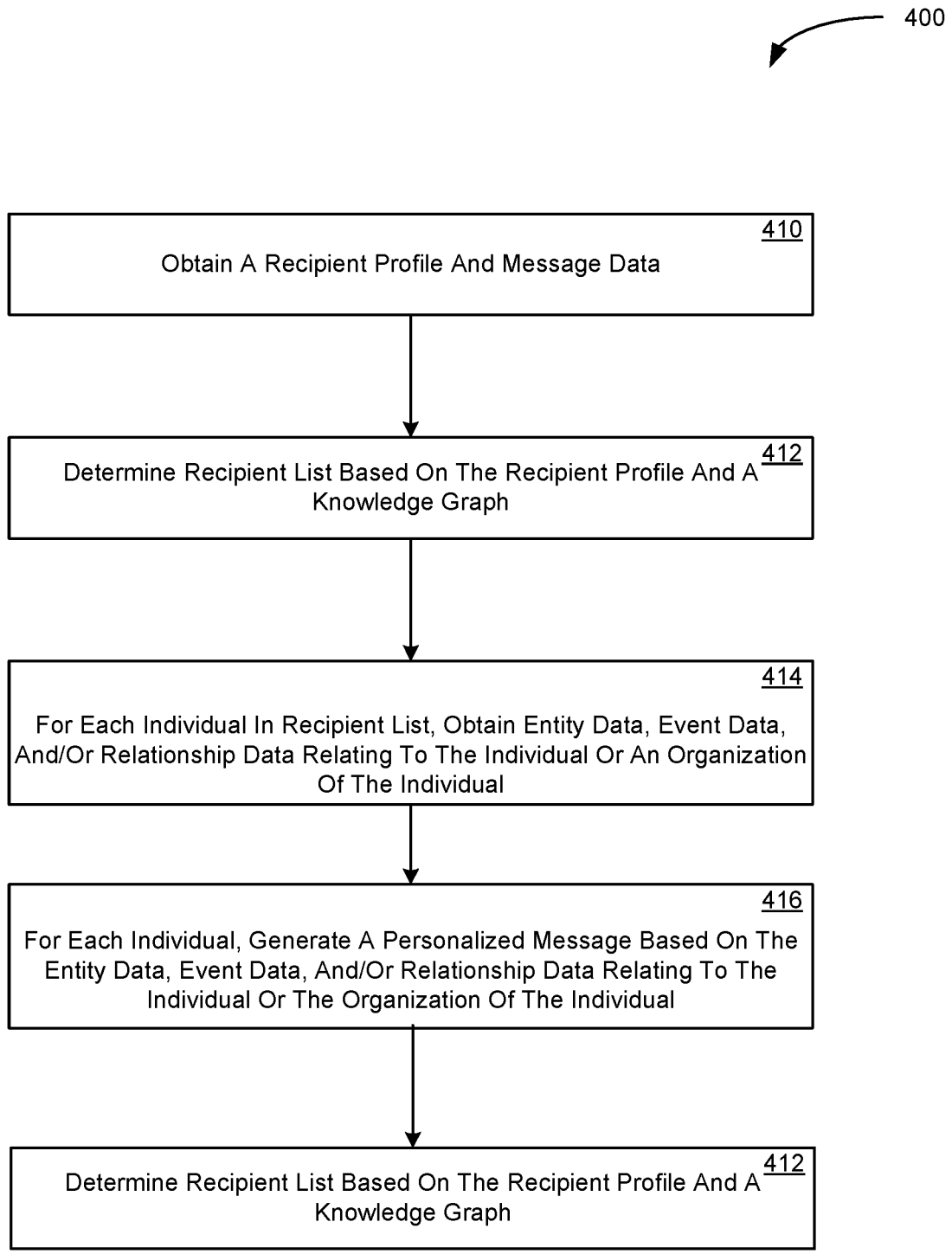
FIG. 15 illustrates a method for generating personalized messages on behalf of a user according to some embodiments of the present disclosure.

FIG. 15 illustrates a method for generating personalized messages on behalf of a user. In embodiments, the method is executed by the system 200 described with respect to FIGS. 10-14. The method 400 may, however, be performed by any suitable system. In embodiments, the method 400 is executed by the processing system 300 of the system 200.

At 410, the system obtains a recipient profile and message data. In embodiments, the message data may include a message template and/or an objective of the message. The message data may be received from a user of the system and/or derived by the system. For example, in some embodiments, the user may provide a message objective and/or the message template. In some embodiments, the user may provide a message object and the system may generate the message template. In embodiments, a recipient profile may indicate one or more attributes of an ideal recipient of a message that is to be sent on behalf of the user. In embodiments, the system may receive the recipient profile from the user. In some embodiments, the system may determine the recipient profile (e.g., the one or more attributes) based on the message objective and/or one or more attributes of the user.

At 412, the system determines a recipient list based on the recipient profile and a knowledge graph. In embodiments, the system may identify individuals in the knowledge graph having the one or more attributes to obtain the recipient list. In embodiments, the system may generate a lead score for individuals having the one or more attributes and may select the recipient list based on the lead scores of the individuals. In embodiments, the lead score may be determined using a machine-learned scoring model. In embodiments, the system may include individuals having the one or attributes and that are associated with a particular type of event (e.g., a change in jobs, a change in management, works for a company that recently was acquired). In some of these embodiments, the time that has lapsed between the present time and the event is taken into consideration when determining the recipient list.

At 414, the system determines, for each individual indicated in the recipient list, entity data, event data, and/or relationship data relating to the individual or an organization of the individual. In embodiments, the system may retrieve the event data, entity data, and/or relationship data from the knowledge graph. For example, the system may begin with an entity node of the individual and may traverse the knowledge graph from the entity node via the relationships of the individual. The system may traverse the knowledge graph to identify any other entities, relationships, or events that are somehow related to the individual and/or entities that are related to the individual. For example, the system may identify information about the individual such as the individual's organization, the individual's educational background, the individual's, the individual's recent publications, news about the individual's organization, news mentions of the individual, and the like.

At 416, the system generates, for each individual indicated in the recipient list, a personalized message that is personalized for the individual based on the entity data, event data, and/or relationship data relating to the individual or an organization of the individual. In embodiments, the system generates directed content for each individual in the recipient list. The directed content may be based on the entity data, event data, and/or relationship data relating to the individual and/or the organization of the individual. In embodiments, the system may employ natural language generators to generate the directed content using entity data, event data, and/or relationship data. In embodiments, the system may employ a generative model to generate the directed content based on the entity data, event data, and/or relationship data. In embodiments, the system may, for each individual, merge the directed content generated for the individual with the message template to obtain a personalized message.

At 418, the system provides the personalized messages. In embodiments, the system may provide the personalized messages by transmitting each personalized message to an account of the individual for which the message was personalized. In response to transmitting a personalized message to an individual, the system may receive feedback data indicating an outcome of the personalized message (e.g., was the message opened and/or responded to, was a link in the message clicked, was an attachment in the message downloaded. The system may use the feedback data to reinforce the learning of one or more of the models described above and/or as training data to train new machine-learned models. In embodiments, the system may provide the personalized messages by transmitting each personalized message to a client device of the user, whereby the user may approve a personalized message for transmission and/or edit a personalized message before transmission to the individual.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

As used herein, the term system may define any combination of one or more computing devices, processors, modules, software, firmware, or circuits that operate either independently or in a distributed manner to perform one or more functions. A system may include one or more subsystems.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The present disclosure should therefore not be considered limited to the particular embodiments described above. Various modifications, equivalent processes, as well as numerous structures to which the present disclosure may be applicable, will be readily apparent to those skilled in the art to which the present disclosure is directed upon review of the present disclosure.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having", as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons of ordinary skill in the art may appreciate that numerous design configurations may be possible to enjoy the functional benefits of the inventive systems. Thus, given the wide variety of configurations and arrangements of embodiments of the present disclosure, the scope of the disclosure is reflected by the breadth of the claims below rather than narrowed by the embodiments described above.

What is claimed is:

1. A method comprising:
   obtaining, by a processing system, a recipient profile indicating one or more attributes of an ideal recipient of a message to be sent on behalf of a user;
   obtaining, by the processing system, message data indicating one or more of an objective of the message and a message template that comprises content to be included in the message;

determining, by the processing system, a recipient list based on the recipient profile and a knowledge graph that stores:
  entity data relating to a plurality of entities, each entity being of a particular entity type of a plurality of different entity types and having one or more entity attributes that are stored in the knowledge graph, wherein the plurality of different entity types include business entities and individual entities,
  relationship data relating to a plurality of relationships, each relationship being of a particular relationship type of a plurality of relationship types, wherein at least a subset of the plurality of relationships represent relationships between two entities,
  event data relating to a plurality of detected events relating to entities and the plurality of relationships represented in the knowledge graph,
  wherein the recipient list identifies one or more individuals that are more likely to result in a successful outcome given the recipient profile and information represented in the knowledge graph;
for each individual in the recipient list:
  generating, by the processing system, a personalized message that is personalized to each individual based on one or more of the entity data, the relationship data, and the event data; and
  providing, by the processing system, the personalized message via a communication network;
after providing the personalized message for each individual in the recipient list, receiving, by the processing system, one or more digital documents obtained from crawling a public source by one or more crawlers;
extracting, by the processing system, a new entity from the one or more digital documents obtained from the crawling;
extracting, by the processing system, a new relationship relating to the new entity and a previous entity based on the one or more digital documents obtained from the crawling and the knowledge graph, the previous entity being represented in the knowledge graph by a previous node; and
updating, by the processing system, the knowledge graph with a new node representing the new entity and a new edge corresponding to the new relationship, wherein the new edge connects the new node to the previous node.

2. The method of claim 1, wherein providing the personalized message comprises transmitting the personalized message to an account associated with each individual.

3. The method of claim 1, wherein providing the personalized message comprises transmitting the personalized message to a client device of the user.

4. The method of claim 1, wherein the knowledge graph stores a plurality of nodes and a plurality of edges that connect respective nodes from the plurality of nodes, wherein each node represents a respective entity of a respective entity type and each edge corresponds to a respective relationship of a respective relationship type.

5. The method of claim 1, further comprising:
  extracting, by the processing system, a new event corresponding to the new entity, wherein extracting the new relationship is further based on the new event.

6. The method of claim 5, wherein the new event is extracted using an event classification model that is trained to identify events indicated in documents.

7. The method of claim 5, wherein the new relationship is extracted using an inference engine.

8. The method of claim 1, wherein the new entity is extracted using an entity classification model that is trained to identify entities indicated in documents.

9. The method of claim 1, wherein obtaining the recipient profile comprises receiving the recipient profile from a client device associated with the user.

10. The method of claim 1, wherein obtaining the recipient profile comprises determining the one or more attributes of the ideal recipient based on the objective of the message and on historical data relating to outcomes associated with previously sent messages generated to achieve the objective of the message.

11. The method of claim 1, wherein determining the recipient list comprises filtering entities from the plurality of entities represented in the knowledge graph based on the one or more attributes.

12. The method of claim 1, wherein determining the recipient list comprises, for each individual of a subset of the one or more individuals represented in the knowledge graph, determining a lead score of each individual based on the one or more attributes of the recipient profile using a machine-learned scoring model.

13. The method of claim 12, wherein the lead score of each individual is further based on an event related to each individual and/or an organization of each individual.

14. The method of claim 12, wherein the lead score of each individual is further based on entity data relating to each individual and/or an organization of each individual.

15. The method of claim 12, wherein the lead score of each individual is further based on relationship data relating to each individual and/or an organization of each individual.

16. The method of claim 1, wherein generating the personalized message for an individual comprises:
  retrieving the entity data from the knowledge graph, wherein the entity data relates to the individual or an organization of the individual;
  generating directed content based on the retrieved entity data, wherein the directed content comprises at least a phrase or sentence that comprises information corresponding to the retrieved entity data; and
  generating the personalized message based on the directed content and the message template.

17. The method of claim 16, wherein the directed content is generated based on a machine-learned generative model that is trained to generate text given entity data of an entity and a particular objective of the personalized message.

18. The method of claim 17, wherein the machine-learned generative model is trained to generate text that is most likely to result in a successful outcome for the personalized message.

19. The method of claim 1, wherein generating the personalized message for an individual comprises:
  retrieving the event data from the knowledge graph, wherein the event data relates to an event that occurred with respect to the individual or an organization of the individual;
  generating directed content based on the retrieved event data, wherein the directed content comprises at least a phrase or sentence that comprises information corresponding to the retrieved event data; and
  generating the personalized message based on the directed content and the message template.

20. The method of claim 19, wherein the directed content is generated based on a machine-learned generative model that is trained to generate text given a particular objective of the personalized message and the event data relating to a known event that occurred with respect to an entity and the particular objective of the personalized message.

21. The method of claim 1, wherein the one or more digital documents crawled by the one or more crawlers include documents obtained from public internet websites.

22. The method of claim 1, further comprising:
seeding the one or more crawlers with a set of resource identifiers from which to obtain the one or more digital documents.

23. The method of claim 1, wherein the processing system uses natural language processing to extract the new entity from the one or more digital documents obtained from the crawling.

* * * * *